US011518898B2

(12) United States Patent
Iioka et al.

(10) Patent No.: US 11,518,898 B2
(45) Date of Patent: Dec. 6, 2022

(54) INK SET AND METHOD FOR PRODUCING PRINTED ARTICLE

(71) Applicant: DIC Corporation, Tokyo (JP)

(72) Inventors: Naoaki Iioka, Kitaadachi-gun (JP); Takahiro Nio, Kitaadachi-gun (JP); Yuri Shouji, Kitaadachi-gun (JP); Masaki Hosaka, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 372 days.

(21) Appl. No.: 16/767,323

(22) PCT Filed: Nov. 29, 2018

(86) PCT No.: PCT/JP2018/043960
§ 371 (c)(1),
(2) Date: May 27, 2020

(87) PCT Pub. No.: WO2019/116906
PCT Pub. Date: Jun. 20, 2019

(65) Prior Publication Data
US 2021/0002504 A1 Jan. 7, 2021

(30) Foreign Application Priority Data
Dec. 11, 2017 (JP) .............................. JP2017-236859

(51) Int. Cl.
C09D 11/40 (2014.01)
B41M 5/00 (2006.01)
C09D 11/322 (2014.01)

(52) U.S. Cl.
CPC ........... *C09D 11/40* (2013.01); *B41M 5/0023* (2013.01); *C09D 11/322* (2013.01)

(58) Field of Classification Search
CPC ........ B41J 11/00; C09D 11/40; C09D 11/322; B41M 5/0023
See application file for complete search history.

(56) References Cited

U.S. PATENT DOCUMENTS 10,406,809 B2 * 9/2019 Ikehata .................... H04N 1/00
2006/0192798 A1 * 8/2006 Kuki ....................... B41J 25/308
347/8

(Continued)

FOREIGN PATENT DOCUMENTS

JP 2005-335280 A 12/2005
JP 2007-331171 A 12/2007

(Continued)

OTHER PUBLICATIONS

International Search Report dated Jan. 29, 2019, issued in counterpart application No. PCT/JP2018/043960 (1 page).

Primary Examiner — Thinh H Nguyen
(74) Attorney, Agent, or Firm — WHDA, LLP

(57) ABSTRACT

The problem to be solved by the present invention is to provide an ink set that enables forming a printed article with reduced bleeding and color mixing. The present invention is an ink set that includes a black pigment ink (a) having a static surface tension (a1) of 20 mN/m to 40 mN/m and at least one pigment ink (b) selected from the group consisting of a magenta pigment ink and a yellow pigment ink. The static surface tension of the pigment ink (b) is smaller than static surface tension (a1) by 0.1 mN/m to 0.7 mN/m.

8 Claims, 1 Drawing Sheet

(56) References Cited

U.S. PATENT DOCUMENTS

2016/0144620 A1 5/2016 Masuda et al.
2016/0333201 A1 11/2016 Umebayashi
2018/0179405 A1 6/2018 Wakabayashi et al.

FOREIGN PATENT DOCUMENTS

| JP | 2015-151430 A | 8/2015 |
| JP | 2016-44239 A | 4/2016 |
| JP | 2016-97585 A | 5/2016 |
| JP | 2017-7338 A | 1/2017 |
| JP | 2017-206021 A | 11/2017 |

* cited by examiner

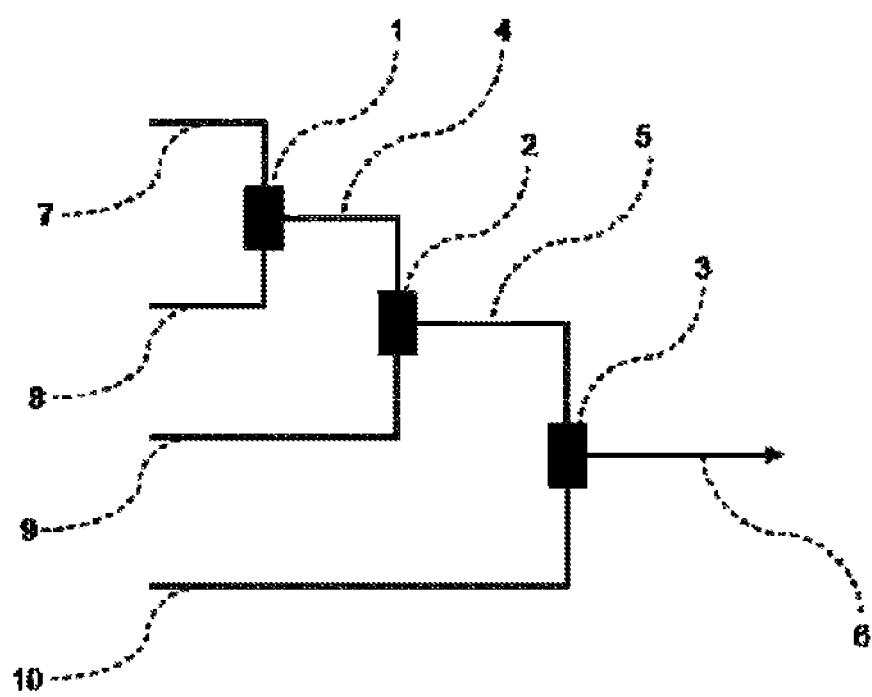

INK SET AND METHOD FOR PRODUCING PRINTED ARTICLE

TECHNICAL FIELD

The present invention relates to an ink set that can be used when producing a printed article by inkjet recording.

BACKGROUND ART

The printing industry has considered using pigment inks for inkjet recording in printing on a wide variety of media, typically ordinary printing paper, coated paper, art paper, plastic film, metal, and fabric, because of the potential of the inks for the formation of printed articles superior in light fastness and other qualities.

In particular, the dramatic growth of the print-on-demand market in recent years has created a need for high-speed printing with water-based pigment inks for inkjet recording on recording media and the production of high-quality printed articles comparable to those obtained by lithography.

High-speed printing of high-quality printed articles requires reducing cross-bleeding at color borders between inks of different hues. A known way to prevent such cross-bleeding of inks is an ink set for an image-forming device, for example one that forms an image by ejecting drops of liquid onto a medium with a pixel density of 650 dpi or more and a recording speed of 0.5 m²/min or more. The ink set contains ink compositions including at least ink composition A and ink composition B and satisfies particular conditions (For example, see PTL 1).

With such inks, however, high-speed printing on a non-absorbent or low-absorbency recording medium, such as coated paper, art paper, or plastic film, can result in a lack of quality in the printed articles because of the failure to reduce cross-bleeding at color borders between inks of different hues to a practically sufficient extent.

CITATION LIST

Patent Literature

PTL 1: Japanese Unexamined Patent Application Publication No. 2005-335280

SUMMARY OF INVENTION

Technical Problem

The problem to be solved by the present invention is to provide an ink set that enables forming printed articles with reduced bleeding and color mixing.

Solution to Problem

The inventors found that an ink set that includes a black pigment ink (a) having a static surface tension (a1) of 20 mN/m to 40 mN/m and at least one pigment ink (b) selected from the group consisting of a magenta pigment ink and a yellow pigment ink would solve the above problem if the static surface tension of the pigment ink (b) is smaller than static surface tension (a1) by 0.1 mN/m to 0.7 mN/m.

Advantageous Effects of Invention

The ink set according to the present invention would help produce printed articles reduced bleeding and color mixing.

BRIEF DESCRIPTION OF THE DRAWING

FIG. 1 is a schematic view of a microreactor used in the present invention.

DESCRIPTION OF EMBODIMENTS

The ink set according to the present invention is an ink set that includes a black pigment ink (a) having a static surface tension (a1) of 20 mN/m to 40 mN/m and at least one pigment ink (b) selected from the group consisting of a magenta pigment ink and a yellow pigment ink. The static surface tension of the pigment ink (b) is smaller than static surface tension (a1) by 0.1 mN/m to 0.7 mN/m.

The black pigment ink (a) used in the present invention has a static surface tension (a1) at 25° C. of 20 mN/m or more, more preferably 23 mN/m or more, even more preferably 25 mN/m or more for the lower limit. As for the upper limit, the black pigment ink (a) has a static surface tension (a1) at 25° C. of 40 mN/m or less, preferably 35 mN/m or less, more preferably less than 30 mN/m. The use of a black pigment ink (a) having a static surface tension (a1) in such a range helps prevent white lines on the printed articles, and the use of it in combination with the pigment ink(s) (b) as described below and other inks helps reduce bleeding and color mixing on the printed articles. Once a black pigment ink (a) having a static surface tension in such a range lands on a recording medium, it wets and spreads quickly enough that its intrinsic quick drying properties and the prevention of bleeding and color mixing go together.

The black pigment ink (a) and the ink set including it, moreover, help prevent streaks on the printed articles effectively. Even if the shortest distance between the ink orifices of the inkjet head used and the recording medium (i.e., the distance from the surface (x) on which the inkjet head has ink orifices to the point (y) where a perpendicular to the surface (x) meets the recording medium) is 2 mm or more, the displacement of the ejected droplets on the recording medium caused by angled flight is apparently smaller.

In the ink set according to the present invention, furthermore, at least one pigment ink (b) is used in combination with the black pigment ink (a).

The pigment ink (b) has a static surface tension at 25° C. smaller than static surface tension (a1) by 0.1 mN/m to 0.7 mN/m, preferably by 0.1 mN/m to 0.3 mN/m.

If the static surface tension of the pigment ink (b) is equal to static surface tension (a1), smaller than static surface tension (a1) by less than 0.1 mN/m, or larger than static surface tension (a1), the black pigment ink (a) easily moves into the pigment ink (b) on the surface of the recording medium, often causing color mixing and bleeding. The problems to be solved by the present invention, i.e., bleeding and color mixing, are conspicuous particularly when the black pigment ink (a) moves into the pigment ink (b) on the recording medium.

If the static surface tension of the pigment ink (b) is smaller than static surface tension (a1) by more than 0.7 mN/m, ink components move too frequently between the black pigment ink (a) and the pigment ink (b) on the surface of the recording medium. This also often causes color mixing and bleeding.

As a way to limit these movements, the pigment ink (b) is ink(s) having a static surface tension smaller than static surface tension (a1) by 0.1 mN/m to 0.7 mN/m and is used in combination with the black pigment ink (a) in the ink set. The inventors believe this leads to further reduction of the movement of the black pigment ink (a) into the pigment ink (b) and reduced movement of the pigment ink (b) into the black pigment ink (a).

Overall, the use of a black pigment ink (a) as described above, having a static surface tension (a1) in any of the ranges specified above, in combination with pigment ink(s) (b) as described above helps prevent cross-bleeding and color mixing between the colors of (at color borders between) the black pigment ink (a) and the pigment ink(s) (b) more effectively. Furthermore, the black pigment ink (a) and the pigment ink(s) (b) can be ejected with a lower likelihood of incomplete ejection and angled flying caused by the black pigment ink (a) and the pigment ink(s) (b) leaking from near the nozzles used to eject them.

In addition, an ink set made as a combination a black pigment ink (a) as described above, having a static surface tension (a1) in any of the ranges specified above, and pigment ink(s) (b) as described above would help obtain printed articles with even less frequent bleeding and color mixing even in printing on a nonabsorbent, low-absorbency, or similar recording medium. Even if ink droplets of the black pigment ink (a) and the pigment ink (b) come into contact after landing on the recording medium, the movement of components from one type of ink to the other is limited.

It should be noted that the static surface tension of the black pigment ink (a) and the pigment ink (b) refers to a measurement taken under the following conditions using an automatic surface tensiometer based on the Wilhelmy method. By the Wilhelmy method, static and dynamic surface tensions can be measured.

Measuring instrument: An automatic surface tensiometer (K100MK3, KRUSS)

Measuring temperature: 25° C.

Measuring probe: A platinum plate

The static surface tension (a1) of the black pigment ink (a) and that of the pigment ink (b) can be adjusted to the intended range by, for example, customizing the type and amount of surfactant, solvent, etc., in particular by customizing the type and amount of surfactant.

The pigment ink (b) can be at least one selected from the group consisting of a magenta pigment ink and a yellow pigment ink. More preferably, the pigment ink (b) is a magenta pigment ink and a yellow pigment ink.

If the pigment ink (b) is a combination of a magenta pigment ink and a yellow pigment ink and is used in combination with the black pigment ink (a) in the ink set, the setting in which the black pigment ink (a) and then the magenta and yellow pigment inks are ejected onto the recording medium by inkjet recording is preferred in ensuring the ink set will bring the advantage of reduced bleeding and color mixing. In that case, the combination of a magenta pigment ink that has a static surface tension smaller than that (a1) of the black pigment ink by 0.1 mN/m to 0.7 mN/m, preferably by 0.1 mN/m to 0.5 mN/m, preferably by 0.1 mN/m to 0.3 mN/m, and a yellow pigment ink that has a static surface tension smaller than that of the magenta pigment ink by 0.1 mN/m to 0.7 mN/m, preferably by 0.1 mN/m to 0.5 mN/m, preferably by 0.1 mN/m to 0.3 mN/m is preferred in ensuring the ink set will bring the advantage of reduced bleeding and color mixing.

If the pigment ink (b) is a magenta pigment ink and a yellow pigment ink and is used in the ink set in combination with the black pigment ink (a) and an optional cyan pigment ink different from both, the setting in which the cyan pigment ink, the black pigment ink (a), and then the magenta and yellow pigment inks are ejected onto the recording medium by inkjet recording is preferred in ensuring the ink set will bring the advantage of reduced bleeding and color mixing. In that case, the combination of a magenta pigment ink that has a static surface tension smaller than static surface tension (a1) by 0.1 mN/m to 0.7 mN/m, preferably by 0.1 mN/m to 0.5 mN/m, preferably by 0.1 mN/m to 0.3 mN/m, a yellow pigment ink that has a static surface tension smaller than that of the magenta pigment ink by 0.1 mN/m to 0.7 mN/m, preferably by 0.1 mN/m to 0.5 mN/m, preferably by 0.1 mN/m to 0.3 mN/m, and a cyan pigment ink with any static surface tension is preferred in ensuring the ink set will bring the advantage of reduced bleeding and color mixing.

If the pigment ink (b) is a magenta pigment ink and a yellow pigment ink and is used in the ink set in combination with the black pigment ink (a) and an optional cyan pigment ink different from both, furthermore, the setting in which the black pigment ink (a), the cyan pigment ink, and then the magenta and yellow pigment inks are ejected onto the recording medium by inkjet recording is preferred in ensuring the ink set will bring the advantage of reduced bleeding and color mixing. In that case, the combination of a magenta pigment ink that has a static surface tension smaller than static surface tension (a1) by 0.1 mN/m to 0.7 mN/m, preferably by 0.1 mN/m to 0.5 mN/m, preferably by 0.1 mN/m to 0.3 mN/m, a yellow pigment ink that has a static surface tension smaller than that of the magenta pigment ink by 0.1 mN/m to 0.7 mN/m, preferably by 0.1 mN/m to 0.5 mN/m, preferably by 0.1 mN/m to 0.3 mN/m, and a cyan pigment ink with any static surface tension is preferred in ensuring the ink set will bring the advantage of reduced bleeding and color mixing.

The cyan pigment ink can be one that has a static surface tension smaller than the static surface tension (a1) of the black pigment ink (a) by 0.1 mN/m to 0.7 mN/m, preferably by 0.1 mN/m to 0.5 mN/m, preferably by 0.1 mN/m to 0.3 mN/m like the pigment ink (b). However, a cyan pigment ink with any static surface tension may be used as an optional ink different from the pigment ink (b). Even if the black pigment ink (a) moves into the cyan pigment ink, the bleeding and other resulting defects are not conspicuous.

In that case, the cyan pigment ink preferably has a static surface tension at 25° C. of 20 mN/m or more, preferably 23 mN/m or more, in particular 25 mN/m or more for the lower limit. As for the upper limit, the cyan pigment ink preferably has a static surface tension (a1) at 25° C. of 40 mN/m or less, more preferably 35 mN/m or less, in particular less than 30 mN/m.

The static surface tension (a1) of the black pigment ink (a) and that of the pigment ink (b) can be set to fall within any of the ranges specified above by, for example, customizing the type and amount of surfactant, solvent, and other ingredients contained therein. The inventors believe surfactants have great impact in adjusting the static surface tension.

If the black pigment ink (a) and the pigment ink (b) are made with the same kind of surfactant or surfactants having similar potential for reducing surface tension, an exemplary approach is to control their static surface tension to fall within any of the ranges specified above by adjusting the surfactant content. With the same kind of surfactant or surfactants having similar potential for reducing surface tension, inks containing more surfactant generally tend to have a small static surface tension in comparison with inks containing less surfactant. In such a setting, therefore, it is easy and convenient to adjust the surfactant content to bring the static surface tension of the black pigment ink (a) and the pigment ink (b) into any of the particular ranges specified above.

However, even a black pigment ink and a pigment ink as described above containing the same type and the same amount of surfactant do not always have the same static surface tension. This is because the compatibility of pigments in inks with a given surfactant varies.

In the present invention, if the same kind of surfactant is used, and when it is assumed that the total surfactant content (proportion by mass) of the black pigment ink (a) is 1, it is preferred to adjust the surfactant content so that the total surfactant content (proportion by mass) of a cyan pigment ink that can be used as a pigment ink (b) will be between 0.5 and 1.5, in particular between 0.8 and 1.2. It is preferred to adjust the surfactant content so that the total surfactant content (proportion by mass) of a magenta pigment ink that can be used as a pigment ink (b) will be between 0.5 and 1.5, in particular between 0.8 and 1.2. It is preferred to adjust the surfactant content so that the total surfactant content (proportion by mass) of a yellow pigment ink that can be used as a pigment ink (b) will be between 0.5 and 1.5, in particular between 0.8 and 1.2.

The pigment ink (b), furthermore, is ejected onto the recording medium by inkjet recording after the black pigment ink (a) is ejected by inkjet recording and lands on the recording medium. If the pigment ink (b) is ejected by inkjet recording and lands on the recording medium first and then the black pigment ink (a) is ejected onto the recording medium by inkjet recording, it can cause the black pigment ink (a) to move into the pigment ink (b) easily. The ink set according to the present invention, made as a combination of a black pigment ink (a) and pigment ink(s) (b) varying in static surface tension and assigned to be ejected by inkjet recording in a particular order, would bring the advantage of reduced bleeding and color mixing.

(Black Pigment Ink (a))

The black pigment ink (a) is described in detail.

The black pigment ink (a) can be, for example, one that contains a surfactant, a pigment, water, and an organic solvent.

The surfactant can be used to adjust the static surface tension (a1) of the black pigment ink (a) to any of the ranges specified above.

Examples of surfactants include nonionic surfactants, anionic surfactants, cationic surfactants, and amphoteric surfactants. More preferably, a nonionic surfactant is used.

Examples of anionic surfactants include alkylbenzene sulfonates, alkylphenyl sulfonates, alkylnaphthalene sulfonates, higher fatty acid salts, sulfates of higher fatty acid esters, sulfonates of higher fatty acid esters, sulfates and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates, and specific examples of these include dodecylbenzene sulfonate, isopropylnaphthalene sulfonate, monobutylphenylphenol monosulfonate, monobutylbiphenyl sulfonate, and dibutylphenylphenol disulfonate.

Examples of nonionic surfactants include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene sorbitol fatty acid esters, glycerol fatty acid esters, polyoxyethylene glycerol fatty acid esters, polyglycerol fatty acid esters, sucrose fatty acid esters, polyoxyethylene alkylamines, polyoxyethylene fatty acid amides, fatty acid alkylolamides, alkyl alkanolamides, acetylene glycol, oxyethylene adducts of acetylene glycol, and polyethylene glycol polypropylene glycol block copolymers, and preferred are polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, and polyethylene glycol polypropylene glycol block copolymers. The use of an acetylene surfactant, such as acetylene glycol or an oxyethylene adduct of acetylene glycol, is more preferred because acetylene surfactants greatly reduce the static surface tension (a1) of the black pigment ink (a) even in small amounts, provide an easy way to adjust it to any of the ranges specified above, and help prevent bleeding and color mixing on the printed articles when the black pigment ink (a) is used in combination with the pigment ink (b).

Other surfactants that can be used include silicone surfactants, such as polysiloxane oxyethylene adducts; fluorosurfactants, such as perfluoroalkyl carboxylates, perfluoroalkyl sulfonates, and oxyethylene perfluoroalkyl ethers; and biosurfactants, such as spiculisporic acid, rhamnolipids, and lysolecithins. The use of a silicone surfactant that is a polysiloxane oxyethylene adduct is more preferred because such silicone surfactants greatly reduce the static surface tension (a1) of the black pigment ink (a) even in small amounts, provide an easy way to adjust it to any of the ranges specified above, and help prevent bleeding and color mixing on the printed articles when the black pigment ink (a) is used in combination with the pigment ink (b).

Preferably, the surfactant is used in an amount of 0.001% by mass to 4% by mass, more preferably 0.01% by mass to 2% by mass, of the total amount of the black pigment ink (a). The use of 0.1% by mass to 1.5% by mass surfactant is even more preferred in obtaining an ink set that helps further reduce the occurrence of bleeding and color mixing on printed articles even in printing on a nonabsorbent, low-absorbency, or similar recording medium.

A pigment that can be used in the black pigment ink (a) is carbon black. The carbon black can be, for example, carbon black produced by a known process, such as the channel black, furnace black, or thermal black process.

Examples of types of carbon black that can be used in the black pigment include Mitsubishi Chemical's products, such as No. 2300, No. 2200B, No. 900, No. 960, No. 980, No. 33, No. 40, No, 45, No. 45L, No. 52, HCF88, MA7, MA8, and MA100, Columbia's products, such as Raven 5750, Raven 5250, Raven 5000, Raven 3500, Raven 1255, and Raven 700, Cabot's products, such as Regal 400R, Regal 330R, Regal 660R, Mogul L, Mogul 700, Monarch 800, Monarch 880, Monarch 900, Monarch 1000, Monarch 1100, Monarch 1300, and Monarch 1400, and Degussa's products, such as Color Black FW1, FW2, FW2V, FW18, FW200, 5150, 5160, and 5170, Printex 35, U, V, and 1400U, Special Black 6, 5, 4, and 4A, and NIPEX 150, NIPEX 160, NIPEX 170, and NIPEX 180.

In the production of the black pigment ink (a), it is preferred to use pigment dispersion, i.e., a dispersion prepared beforehand by dispersing the black pigment in water or a similar solvent.

If pigment dispersion is used, the black pigment is preferably one that can be dispersed in the solvent in a stable manner.

The pigment dispersant can be, for example, one prepared by dispersing the pigment in water or a similar solvent using a pigment dispersant, such as a polymeric dispersant, surfactant, or pigment derivative.

An example of a pigment dispersible in solvent is one having a group that imparts dispersibility (hydrophilic group or its base) on its surface.

Alternatively, the pigment may be a self-dispersible pigment, which can be dispersed in a water-containing solvent without a pigment dispersant.

The self-dispersible pigment can be, for example, one produced by introducing (grafting) a dispersibility-imparting group to the surface of a pigment through physical or chemical treatment of the pigment.

Examples of methods for the physical or chemical treatment of the pigment include plasma treatment in a vacuum, oxidation with a hypohalous acid and/or a salt of a hypohalous acid, and oxidation with ozone as well as wet oxidation, i.e., oxidizing the surface of the pigment in water using an oxidizing agent, and binding p-aminobenzoic acid to the surface of the pigment to bind the carboxyl group via the phenyl group.

Preferably, the pigment constitutes 1% by mass to 20% by mass, more preferably 1% by mass to 10% by mass, because of the need for a sufficiently high image density and to ensure stable dispersion of the pigment in the ink.

For water that can be used in the black pigment ink (a), it is possible to use purified water, such as ion exchange water, ultrafiltered water, reverse osmosis water, or distilled water, or ultrapure water.

The black pigment ink (a) can be one that contains an organic solvent. The organic solvent is optional and can be used to, for example, improve the drying of the ink and prevent the black pigment ink (a) from wetting and spreading excessively, to such an extent that it causes color mixing and bleeding, after landing on the recording medium.

The organic solvent can be, for example, a water-soluble organic solvent that has a boiling point of 100° C. or more and 200° C. or less and a vapor pressure of 0.5 hPa or more at 20° C.

A black pigment ink (a) containing such a water-soluble organic solvent is superior in drying after landing on a nonabsorbent, low-absorbency, or similar recording medium. It therefore facilitates forming printed articles with reduced bleeding and color mixing.

Examples of such water-soluble organic solvents include 3-methoxy-1-butanol, 3-methyl-3-methoxy-1-butanol, 3-methoxy-3-methyl-1-butyl acetate, ethylene glycol monomethyl ether, ethylene glycol monoethyl ether, ethylene glycol monopropyl ether, ethylene glycol monobutyl ether, ethylene glycol monoisobutyl ether, ethylene glycol-t-butyl ether, propylene glycol monomethyl ether, propylene glycol monoethyl ether, propylene glycol monopropyl ether, propylene glycol monomethyl ether acetate, diethylene glycol dimethyl ether, diethylene glycol methyl ethyl ether, diethylene glycol diethyl ether, dipropylene glycol dimethyl ether, 4-methoxy-4-methyl-2-pentanone, and ethyl lactate. Such solvents can be used alone or as a combination of two or more.

In particular, the use of a water-soluble organic solvent for which the hydrogen-bond term $\delta_H$ in the HSP (Hansen solubility parameters) is between 6 and 20 is preferred for the storage stability of the black pigment ink (a) and the component compatibility with inkjet devices. The component compatibility with inkjet devices refers to ink's tendency to damage an inkjet device by swelling or dissolving its components when staying in contact with the device's head unit or internal flow channels for a long time.

Examples of preferred water-soluble organic solvents whose HSP fall within the above range include 3-methoxy-1-butanol, 3-methyl-3-methoxy-1-butanol, ethylene glycol monomethyl ether, ethylene glycol monoethyl ether, ethylene glycol, ethylene glycol monobutyl ether, ethylene glycol monoisobutyl ether, ethylene glycol-t-butyl ether, propylene glycol monomethyl ether, and propylene glycol monoethyl ether. It is particularly preferred to use 3-methoxy-1-butanol and/or 3-methyl-3-methoxy-1-butanol.

In the present invention, the use of such a water-soluble organic solvent together with a combination of propylene glycol and at least one organic solvent selected from the group consisting of glycerol, diglycerol, glycerol derivatives, and diglycerol derivatives is preferred in ensuring good ejection. It helps prevent the black pigment ink (a) from forming a coating by drying or coagulating near the nozzles used to eject it, without compromising the drying of the black pigment ink (a) after landing on the recording medium. With such a set of solvents, furthermore, the coating disperses again in a new supply of the black pigment ink (a) even if formed.

Examples of glycerol derivatives and diglycerol derivatives include polyglycerol, diglycerol fatty acid esters, polyoxypropylene(n) polyglyceryl ethers, which are represented by general formula (1), and polyoxyethylene(n) polyglyceryl ethers, which are represented by general formula (2), and two or more of such derivatives may be used together. In the present invention, it is particularly preferred to select glycerol or a polyoxypropylene(n) polyglyceryl ether for which n=8 to 15.

[Chem. 1]

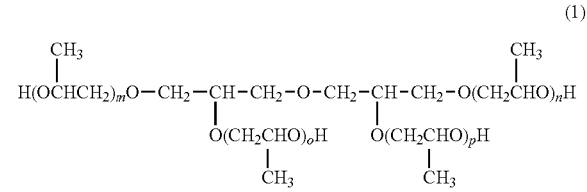

(1)

[Chem. 2]

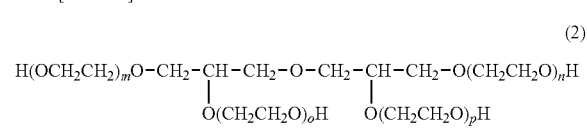

(2)

In general formulae (1) and (2), m, n, o, and p each independently represent an integer of 1 to 10.

Preferably, the water-soluble organic solvent is used in an amount of 1% by mass to 20% by mass, more preferably 1% by mass to 15% by mass, of the mass of the black pigment ink (a). The use of 1% to 10% by mass water-soluble organic solvent is particularly preferred in forming printed articles with even less bleeding and color mixing even in printing on a nonabsorbent, low-absorbency, or similar recording medium.

Propylene glycol is preferably used in an amount of 1% by mass to 30% by mass, more preferably 1% by mass to 25% by mass, of the mass of the black pigment ink (a). The use of 1% by mass to 20% by mass propylene glycol is particularly preferred in obtaining an inkjet recording ink that ejects well and is still quick to dry.

The at least one organic solvent selected from the group consisting of glycerol, diglycerol, glycerol derivatives, and diglycerol derivatives is preferably used in an amount of 1% by mass to 20% by mass, more preferably 2% by mass to 18% by mass, of the mass of the black pigment ink (a). The use of 4% to 15% by mass such solvent(s) is particularly preferred in controlling, for example, the drying of the black pigment ink (a) near the nozzles used to eject it.

For the organic solvent, water-soluble solvents can be used as well as the solvents described above. Examples include ketones, such as acetone, methyl ethyl ketone, methyl butyl ketone, and methyl isobutyl ketone; alcohols, such as methanol, ethanol, 2-propanol, 2-methyl-1-propanol, 1-butanol, and 2-methoxyethanol; ethers, such as tetrahydrofuran, 1,4-dioxane, and 1,2-dimethoxyethane; glycols, such as dimethyl formamide, N-methyl pyrrolidone, ethylene glycol, diethylene glycol, triethylene glycol, tetraethylene glycol, polyethylene glycol, and polypropylene glycol; diols, such as butanediol, pentanediol, hexanediol, 3-methyl-1,5-pentanediol, and their homologous diols; glycol esters, such as propylene glycol laurate; cellosolve and other glycol ethers, including diethylene glycol monoethyl, diethylene glycol monobutyl, and diethylene glycol monohexyl ethers and propylene glycol ether, dipropylene glycol ether, and triethylene glycol ether; methanol, ethanol, isopropyl alcohol, 1-propanol, 2-propanol, 1-butanol, 2-butanol, butyl alcohol, pentyl alcohol, and their homologous alcohols; and lactons, such as γ-butyrolactone; and lactams, such as N-(2-hydroxyethyl)pyrrolidone. Such solvents can be used alone or as a combination of two or more.

The black pigment ink (a) can be one that contains a resin for dispersing the pigment.

The resin for dispersing the pigment can be of any kind. Known polymeric dispersants, surfactants, and pigment derivatives can be used.

The resin for dispersing the pigment can be a water-based resin, and examples of preferred water-based resins include polyvinyl alcohols, polyvinyl pyrrolidones, acrylic acid-acrylate copolymers and other acrylic resins, styrene-acrylic acid copolymers, styrene-methacrylic acid copolymers, styrene-methacrylic acid-acrylate copolymers, styrene-α-methylstyrene-acrylic acid copolymers, styrene-α-methylstyrene-acrylic acid-acrylate copolymers, and other styrene-acrylic resins, styrene-maleic acid copolymers, styrene-maleic anhydride copolymers, vinylnaphthalene-acrylic acid copolymers, and salts of these water-based resins. Naturally, commercially available water-based resins can also be used. Commercially available water-based resins that can be used include AJISPER PB resins, which are Ajinomoto Fine-Techno Inc.'s products), BYK Japan KK's Disperbyk resins, BASF's EFKA resins, Lubrizol Japan Ltd.'s SOLSPERSE resins, and Evonik's TEGO resins.

Preferably, the resin for dispersing the pigment is polymer (A) described below. This is preferred in obtaining a black pigment ink (a) with a significantly low presence of coarse particles.

Polymer (A) used in the present invention is a polymer that has a solubility in water of 0.1 g/100 ml or less, a number-average particle diameter between 1000 and 6000, and anionic groups. Preferably, the polymer forms fine particles in water when its anionic groups are neutralized with a basic compound to a percentage of 100%.

The solubility in water of polymer (A) was defined as follows. Particles of the polymer were sieved to a diameter of 250 μm to 90 μm through screens with a pore size of 250 μm and 90 μm, and 0.5 g of the sieved polymer was sealed in a bag made from a 400-mesh metal sheet. The bag was immersed in 50 ml of water and left with gentle stirring for 24 hours at a temperature of 25° C. After the 24-hour immersion, the 400-mesh metal sheet containing the polymer was dried by drying for 2 hours in a drying oven set to 110° C. The change in the weight of the 400-mesh metal sheet containing the polymer from before to after immersion in water was measured, and the solubility was calculated in accordance with the following equation.

$$\text{Solubility } (g/100 \text{ ml}) = (\text{400-Mesh metal sheet containing the polymer before immersion } (g) - \text{400-Mesh metal sheet containing the polymer after immersion } (g)) \times 2 \quad [\text{Math. 1}]$$

In the present invention, furthermore, the following procedure was followed to determine whether polymer (A) forms fine particles in water when its anionic groups are neutralized with a basic compound to a percentage of 100%.

(1) The acid value of the polymer is measured beforehand by a method for measuring acid value based on JIS Test Method K 0070-1992. Specifically, 0.5 g of the polymer is dissolved in the tetrahydrofuran (hereinafter also referred to as THF) solvent, and the acid value is determined by titration with a 0.1 M alcohol solution of potassium hydroxide using phenolphthalein as an indicator.

(2) One gram of the polymer is added to 50 ml of water, and a 0.1 mol/L aqueous solution of potassium hydroxide is added enough for 100% neutralization of the determined acid value, making the solution 100% neutral.

(3) The 100% neutralized solution is sonicated in an ultrasonicator (SND Co., Ltd. US-102 ultrasonicator, 38-kHz self-excited vibrations) for 2 hours at a temperature of 25° C. and then left for 24 hours at room temperature.

After being left for 24 hours, the solution is sampled at a depth of 2 centimeters from its surface, and the sample solution is analyzed using a dynamic-light-scattering particle size distribution analyzer (Nikkiso Co., Ltd.'s dynamic-light-scattering particle size analyzer "Microtrac UPA-ST150 particle size distribution analyzer"). Whether fine particles are present is checked by determining whether light-scattering data resulting from the formation of fine particles are obtained.

Preferably, the fine particles formed by polymer (A) used in the present invention are ones having a volume-average diameter between 5 nm and 1000 nm, more preferably between 7 nm and 700 nm, in particular between 10 nm and 500 nm. This is preferred in further improving the stability of the polymer when dispersed in water.

Polymer (A) tends to disperse the pigment better with narrower size distribution of fine particles, but this does not mean implementation with a broad particle size distribution is excluded. The volume-average particle diameter and particle size distribution were measured using a dynamic-light-scattering particle size distribution analyzer (Nikkiso Co., Ltd.'s dynamic-light-scattering particle size analyzer "Microtrac UPA-ST150 particle size distribution analyzer") as in the measurement of fine particles.

(Percentage Neutralization of Polymer (A))

The percentage neutralization of polymer (A) used in the present invention was determined in accordance with the following equation.

$$\text{Percentage neutralization } (\%) = ((\text{Mass of the basic compound}(g) \times 56 \times 100)/(\text{Acid value of polymer } (A)(mg \text{ } KOH/g) \times \text{The number of equivalents of the basic compound} \times \text{Mass of polymer}(A)(g))) \times 100 \quad [\text{Math. 2}]$$

The acid value of polymer (A) was measured on the basis of JIS Test Method K 0070-1992. Specifically, a 0.5-g sample was dissolved in the THF solvent, and the acid value was determined by titration with a 0.1 M alcohol solution of potassium hydroxide using phenolphthalein as an indicator.

Preferably, the acid value of polymer (A) is between 40 and 400 mg KOH/g, more preferably between 40 and 300 mg KOH/g, the most preferably between 40 and 190 mg KOH/g.

It is preferred that the number-average molecular weight of polymer (A) be between 1000 and 6000 in giving polymer (A) the ability to disperse the pigment well. More preferably, the number-average molecular weight is between 1300 and 5000, the most preferably between 1500 and 4500.

In the present invention, a number-average molecular weight is a polystyrene-equivalent value measured by GPC (gel permeation chromatography), specifically that taken under the following conditions.

(Measurement of the Number-Average Molecular Weight (Mn))

The number-average molecular weight was measured by gel permeation chromatography (GPC) under the following conditions.

Measuring instrument: A high-performance GPC system (Tosoh Corporation "HLC-8220GPC")

Columns: The following columns, available from Tosoh Corporation, were used in series connection.

One "TSKgel G5000" column (7.8 mm I.D.×30 cm)
One "TSKgel G4000" column (7.8 mm I.D.×30 cm)
One "TSKgel G3000" column (7.8 mm I.D.×30 cm)
One "TSKgel G2000" column (7.8 mm I.D.×30 cm)

Detector: An RI (refractive index detector)
Column temperature: 40° C.
Eluent: Tetrahydrofuran (THF)
Flow rate: 1.0 mL/min
Injection volume: 100 μL (solution of 0.4% by mass sample in THF)

Reference samples: The standard polystyrenes listed below were used to create a calibration curve.

(Standard Polystyrenes)
Tosoh Corporation "TSKgel Standard Polystyrene A-500"
Tosoh Corporation "TSKgel Standard Polystyrene A-1000"
Tosoh Corporation "TSKgel Standard Polystyrene A-2500"
Tosoh Corporation "TSKgel Standard Polystyrene A-5000"
Tosoh Corporation "TSKgel Standard Polystyrene F-1"
Tosoh Corporation "TSKgel Standard Polystyrene F-2"
Tosoh Corporation "TSKgel Standard Polystyrene F-4"
Tosoh Corporation "TSKgel Standard Polystyrene F-10"
Tosoh Corporation "TSKgel Standard Polystyrene F-20"
Tosoh Corporation "TSKgel Standard Polystyrene F-40"
Tosoh Corporation "TSKgel Standard Polystyrene F-80"
Tosoh Corporation "TSKgel Standard Polystyrene F-128"
Tosoh Corporation "TSKgel Standard Polystyrene F-288"
Tosoh Corporation "TSKgel Standard Polystyrene F-550"

Preferably, polymer (A) is a polymer that is insoluble or sparingly soluble when all of its anionic groups have yet to be neutralized and that forms fine particles when all of its anionic groups have been neutralized.

Polymer (A) can be a polymer that has hydrophobic groups in addition to the anionic groups as hydrophilic groups. An example of such a polymer is a block polymer that has a polymer block having hydrophobic groups and a polymer block having anionic groups.

For the numbers of hydrophobic groups and anionic groups, it becomes more likely that polymer (A) does not form fine particles when the solubility in water exceeds 0.1 g/100 ml or its anionic groups are neutralized with a basic compound to a percentage of 100%. In this light, it is preferred that the number of anionic groups be not very large. It should be noted that the relation of the number of anionic groups and the solubility in water of a polymer are not necessarily determined by the acid value and the number of anionic groups in the polymer as designed. For example, even with polymers having the same acid value, those having a lower molecular weight tend to be more soluble in water, and those having a higher molecular weight tend to be less soluble in water. For this reason, in the present invention, polymer (A) is defined by solubility in water.

Polymer (A) may be a homopolymer, but preferably is a copolymer. The copolymer may be a random polymer or block polymer or may be an alternating polymer, but it is particularly preferred that it be a block polymer. The polymer may be a branched polymer, but preferably is a linear polymer.

Preferably, polymer (A) is a vinyl polymer because of design flexibility. To produce a vinyl polymer that has a molecular weight and solubility characteristics desired in the present invention, it is preferred to produce it using "living polymerization", such as living free-radical polymerization, living cationic polymerization, or living anionic polymerization.

In particular, polymer (A) is preferably a vinyl polymer produced using a (meth)acrylate monomer as one of its raw materials. Such a vinyl polymer is produced preferably by living free-radical polymerization or living anionic polymerization, more preferably by living anionic polymerization because it allows for more precise design of the molecular weight and each segment of a block polymer.

Specifically, polymer (A) produced by living anionic polymerization can be a polymer represented by general formula (3).

[Chem. 3]

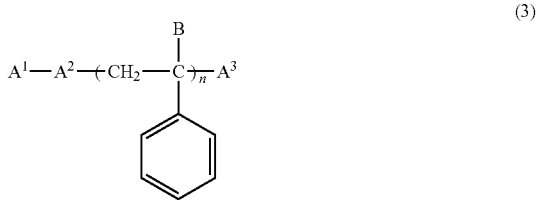

(3)

In formula (3), $A^1$ represents an organic lithium initiator residue, $A^2$ represents a polymer block formed by monomers having an aromatic ring or heterocycle, $A^3$ represents a polymer block containing anionic groups, n represents an integer of 1 to 5, and B represents an aromatic or alkyl group.

In general formula (3), $A^1$ represents an organic lithium initiator residue. Specific examples of organic lithium initiators include alkyllithiums, such as methyllithium, ethyllithium, propyllithium, butyllithium (n-butyllithium, sec-butyllithium, iso-butyllithium, tert-butyllithium, etc.), pentyllithium, hexyllithium, methoxymethyllithium, and ethoxymethyllithium; phenylalkylenelithiums, such as benzyllithium, α-methylstyryllithium, 1,1-diphenyl-3-methylpentyllithium, 1,1-diphenylhexyllithium, and phenylethyllithium; alkenyllithiums, such as vinyllithium, allyllithium, propenyllithium, and butenyllithium; alkynyllithiums, such as ethynyllithium, butynyllithium, pentynyllithium, and hexynyllithium; aryllithiums, such as phenyllithium and naphthyllithium; heterocycle lithiums, such as 2-thienyllithium, 4-pyridyllithium, and 2-quinolyllithium; and alkyl-lithium magnesium complexes, such as tri(n-butyl)magnesium lithium and trimethylmagnesium lithium.

An organic lithium initiator initiates polymerization at an active end on its organic group side that is created when the bond between its organic group and lithium is broken. An end of the resulting polymer has an organic group derived from the organic lithium binding thereto. In the present invention, this organic group derived from an organic lithium and binding to an end of the polymer is referred to as an organic lithium initiator residue. For example, for a polymer made using methyllithium as an initiator, the organic lithium initiator residue is a methyl group. For a polymer made using butyllithium as an initiator, the organic lithium initiator residue is a butyl group.

In general formula (3) above, $A^2$ is a polymer block having hydrophobic groups. As stated, the purpose of $A^2$ is to ensure well-balanced solubility. In addition, it is preferred that $A^2$ be a polymer block that adsorbs well to the pigment when touching the pigment. In this light, it is preferred that $A^2$ be a polymer block formed by monomers having an aromatic ring or heterocycle.

Specifically, a polymer block formed by monomers having an aromatic ring or heterocycle is a homopolymeric or copolymeric polymer block obtained by homopolymerizing or copolymerizing monomer(s) having an aromatic ring, such as styrene monomer(s), and/or monomer(s) having a heterocyclic ring, such as vinylpyridine monomer(s).

Examples of monomers having an aromatic ring include styrene monomers, such as styrene, p-tert-butyldimethylsiloxystyrene, o-methylstyrene, p-methylstyrene, p-tert-butylstyrene, p-tert-butoxystyrene, m-tert-butoxystyrene, p-tert-(1-ethoxymethyl)styrene, m-chlorostyrene, p-chlorostyrene, p-fluorostyrene, α-methylstyrene, and p-methyl-α-methylstyrene, vinylnaphthalene, and vinylanthracene.

Examples of monomers having a heterocycle include vinylpyridine monomers, such as 2-vinylpyridine and 4-vinylpyridine.

These monomers can be used alone or as a mixture of two or more.

In general formula (3) above, $A^3$ represents a polymer block containing anionic groups. As stated, a purpose of $A^3$ is to impart adequate solubility. In addition to this, $A^3$ is intended to ensure stable dispersion in water in the pigment dispersion.

The anionic groups in polymer block $A^3$ can be, for example, carboxyl, sulfonic acid, or phosphoric acid groups. In particular, carboxyl groups are preferred because of their preparation and the great variety and availability of monomer species. The anionic groups may be in the form of acid anhydride groups resulting from dehydration condensation of two carboxyl groups within a molecule or between molecules.

How to introduce the anionic groups in $A^3$ is not critical. For example, if the anionic groups are carboxyl groups, $A^3$ may be a homopolymeric or copolymeric polymer block obtained by homopolymerizing (meth)acrylic acid or copolymerizing it with other monomer(s) (PB1), or may be a polymer block prepared by homopolymerizing a (meth) acrylate having protected groups that can be regenerated into anionic groups by deprotection or copolymerizing such a (meth)acrylate with other monomer(s) and then regenerating a subset or all of the protected groups that can be regenerated into anionic groups into anionic groups (PB2).

The (meth)acrylic acid used in polymer block $A^3$ refers to acrylic acid and methacrylic acid, and a (meth)acrylate refers to an acrylate and a methacrylate.

Specific examples of (meth)acrylates include methyl (meth)acrylate, ethyl (meth)acrylate, iso-propyl (meth)acrylate, allyl (meth)acrylate, n-butyl (meth)acrylate, iso-butyl (meth)acrylate, sec-butyl (meth)acrylate, tert-butyl (meth) acrylate, n-amyl (meth)acrylate, iso-amyl (meth)acrylate, n-hexyl (meth)acrylate, n-octyl (meth)acrylate, 2-ethylhexyl (meth)acrylate, n-lauryl (meth)acrylate, n-tridecyl (meth) acrylate, n-stearyl (meth)acrylate, phenyl (meth)acrylate, benzyl (meth)acrylate, cyclohexyl (meth)acrylate, 4-tert-butylcyclohexyl (meth)acrylate, isobornyl (meth)acrylate, tricyclodecanyl (meth)acrylate, dicyclopentadienyl (meth) acrylate, adamantyl (meth)acrylate, glycidyl (meth)acrylate, tetrahydrofurfuryl (meth)acrylate, 2-methoxyethyl (meth) acrylate, 2-ethoxyethyl (meth)acrylate, dimethylaminoethyl (meth)acrylate, diethylaminoethyl (meth)acrylate, trifluoroethyl (meth)acrylate, tetrafluoropropyl (meth)acrylate, pentafluoropropyl (meth)acrylate, octafluoropentyl (meth)acrylate, pentadecafluorooctyl (meth)acrylate, heptadecafluorodecyl (meth)acrylate, N,N-dimethyl(meth) acrylamide, (meth)acryloylmorpholine, (meth)acrylonitrile, polyethylene glycol (meth)acrylate, polypropylene glycol (meth)acrylate, polyethylene glycol-polypropylene glycol (meth)acrylate, polyethylene glycol-polybutylene glycol (meth)acrylate, polypropylene glycol-polybutylene glycol (meth)acrylate, and polyalkyleneoxide-containing (meth) acrylates, such as methoxypolyethylene glycol (meth)acrylate, ethoxypolyethylene glycol (meth)acrylate, butoxypolyethylene glycol (meth)acrylate, octoxypolyethylene glycol (meth)acrylate, lauroxypolyethylene glycol (meth)acrylate, stearoxypolyethylene glycol (meth)acrylate, phenoxypolyethylene glycol (meth)acrylate, methoxypolypropylene glycol (meth)acrylate, and octoxypolyethylene glycol-polypropylene, glycol (meth)acrylate. Such (meth)acrylates can be used alone or as a combination of two or more.

In living anionic polymerization, the use of a monomer that has groups bearing an active proton, such as anionic groups, results in the failure to obtain the polymer because the active end of the polymer undergoing living anionic polymerization immediately becomes deactivated by reacting with these groups bearing an active proton. If living anionic polymerization is used, it is difficult to polymerize a monomer that has groups bearing an active proton as it is. It is therefore preferred to protect the groups bearing an active proton, polymerize the monomer in that state, and then regenerate the protected groups into groups bearing an active proton by removing the protecting groups.

For such reasons, polymer block $A^3$ is made preferably using monomers including a (meth)acrylate that has protected groups that can be regenerated into anionic groups by deprotection. The use of such monomers will help, at polymerization, prevent the polymerization from being inhibited as stated above. The anionic groups protected by protecting groups can be regenerated into anionic groups by deprotecting them after the block polymer is obtained.

For example, if the anionic groups are carboxyl groups, a possible approach is to esterify the carboxyl groups and regenerate the esterified groups into carboxyl groups through deprotection as a later step, for example by hydrolysis. The protected groups that can be converted into carboxyl groups in this case are preferably groups having an ester bond. Examples include primary alkoxycarbonyl groups, such as the methoxycarbonyl, ethoxycarbonyl, n-propoxycarbonyl, and n-butoxycarbonyl groups; secondary alkoxycarbonyl groups, such as the isopropoxycarbonyl and sec-butoxycarbonyl groups; tertiary alkoxycarbonyl groups, such as the t-butoxycarbonyl group; phenylalkoxy groups, such as the benzyloxycarbonyl group; and alkoxyalkylcarbonyl groups, such as the ethoxyethylcarbonyl group.

If the anionic groups are carboxyl groups, examples of monomers that can be used include alkyl (meth)acrylates, such as methyl (meth)acrylate, ethyl (meth)acrylate, n-propyl (meth)acrylate, isopropyl (meth)acrylate, n-butyl (meth)acrylate, sec-butyl (meth)acrylate, isobutyl (meth)acrylate, t-butyl (meth)acrylate, 2-ethylhexyl (meth)acrylate, decyl (meth)acrylate, undecyl (meth)acrylate, dodecyl (meth)acrylate (lauryl (meth)acrylate), tridecyl (meth)acrylate, pentadecyl (meth)acrylate, hexadecyl (meth)acrylate, heptadecyl (meth)acrylate, octadecyl (meth)acrylate (stearyl (meth)acrylate), nonadecyl (meth)acrylate, and icosanyl (meth)acrylate; phenylalkylene (meth)acrylates, such as benzyl (meth)acrylate; and alkoxyalyl (meth)acrylates, such as ethoxyethyl (meth)acrylate. One of these (meth)acrylates (c1) can be used, or two or more can be used in combination. Of these (meth)acrylates (c1), the use of t-butyl (meth)acrylate and/or benzyl (meth)acrylate is particularly preferred because they can be easily converted into carboxyl groups through reaction. Given industrial availability, t-butyl (meth)acrylate is more preferred.

In general formula (3), B represents an aromatic or C1-10 alkyl group. n represents an integer of 1 to 5.

In living anionic polymerization, trying to polymerize a (meth)acrylate monomer directly to the strongly nucleophilic active end of a styrene polymer can fail because of a nucleophilic attack to the carbonyl carbon. When a (meth)acrylate monomer is polymerized to $A^1$-$A^2$, therefore, the nucleophilicity is controlled using a reaction regulator before the polymerization of the (meth)acrylate monomer. B in general formula (3) is a group derived from such a reaction regulator. Specific examples of reaction regulators include diphenylethylene, α-methylstyrene, and p-methyl-α-methylstyrene.

(Living Anionic Polymerization Using a Microreactor)

Under certain reaction conditions, living anionic polymerization can be performed as a batch process like that used in the traditional free-radical polymerization, but there is another method, continuous polymerization using a microreactor. In a microreactor, the polymerization initiator and monomers mix well, which means reactions start at the same time. Uniform temperature ensures the monomers polymerize at equal speed, which means a narrow molecular weight distribution of the resulting polymer. Furthermore, the stability of the growth end facilitates producing a block copolymer in which the two components forming the blocks are not mixed together. It is also easy to reduce side-reactions by virtue of the ease of control of the reaction temperature.

A typical method of living anionic polymerization using a microreactor is described with reference to FIG. 1, a schematic view of a microreactor.

A first monomer and a polymerization initiator that initiates its polymerization are introduced from tube reactors P1 and P2 (7 and 8 in FIG. 1), respectively, into T-shaped micromixer M1 (1 in FIG. 1), which has a flow channel in which multiple liquids can be mixed. Inside T-shaped micromixer M1, the first monomer is polymerized by living anionic polymerization to give a first polymer (step 1).

Then the resulting first polymer is moved to T-shaped micromixer M2 (2 in FIG. 1). Inside mixer M2, the growth end of the polymer is trapped with a reaction regulator introduced from tube reactor P3 (9 in FIG. 1) to regulate reaction (step 2).

The number n in general formula (3) above can be controlled here by the type and amount of reaction regulator.

Then the first polymer in T-shaped micromixer M2, whose reaction has been regulated, is moved to T-shaped micromixer M3 (3 in FIG. 1). Inside mixer M3, a second monomer introduced from a tube reactor P4 and the first polymer whose reaction has been regulated are polymerized by living anionic polymerization (step 3) as continuous polymerization.

Then the reaction is quenched with a compound having an active proton, such as methanol. In this way, a block copolymer is produced.

If a polymer (A) represented by general formula (3) above is produced in this microreactor, the first monomer is a monomer having an aromatic ring or heterocycle, and the initiator is an organic lithium initiator. The reaction gives $A^2$, a polymer block formed by monomers having an aromatic ring or heterocycle (with an organic group that is $A^1$, an organic lithium initiator residue, binding to one end of polymer block $A^2$).

Then the reactivity of the growth end is regulated using a reaction regulator. The aforementioned monomers including (meth)acrylates having protected groups that can be regenerated into anionic groups are thereafter allowed to react as second monomers to give a polymer block.

After that, the protected groups are regenerated into anionic groups through deprotecting reaction, such as hydrolysis. This gives $A^3$, i.e., a polymer block containing anionic groups.

Here is a detailed description of how the ester bond of the protected groups that can be regenerated into anionic groups is regenerated into anionic groups through deprotecting reaction, such as hydrolysis.

The hydrolysis of an ester bond can proceed under acidic or basic conditions, but the conditions somewhat vary depending on the group having the ester bond. For example, if the group having the ester bond is a primary alkoxycarbonyl group, such as the methoxycarbonyl group, or secondary alkoxycarbonyl group, such as the isopropoxycarbonyl group, hydrolysis under basic conditions gives carboxyl groups. Examples of basic compounds used to make the hydrolysis under basic conditions in this case include metal hydroxides, such as sodium hydroxide and potassium hydroxide.

If the group having the ester bond is a tertiary alkoxycarbonyl group, such as the t-butoxycarbonyl group, hydrolysis under acidic conditions gives carboxyl groups. Examples of acidic compounds used to make the hydrolysis under acidic conditions in this case include mineral acids, such as hydrochloric acid, sulfuric acid, and phosphoric acid; Brønsted acids, such as trifluoroacetic acid; and Lewis acids, such as trimethylsilyl triflate. The reaction conditions for hydrolysis under acidic conditions of t-butoxycarbonyl groups are disclosed in, for example, "The Chemical Society of Japan (ed.), the Fifth Series of Experimental Chemistry Vol. 16," which is the fourth volume about the synthesis of organic compounds (in Japanese).

Another method for converting t-butoxycarbonyl groups into carboxyl groups is to use a cation-exchange resin instead of the acid. Examples of cation-exchange resins include resins whose polymer chains have pendant carboxyl (—COOH), sulfo (—$SO_3H$), or other acid groups. Of these, strongly acidic cation-exchange resins that have pendant sulfo groups are particularly preferred because they help ensure the reaction proceeds quickly. Examples of commercially available cation-exchange resins that can be used in the present invention include Organo Corporation's "Amberlite" strongly acidic cation-exchange resins. The amount of cation-exchange resin used is preferably between 5 and 200 parts by mass, more preferably between 10 and 100 parts by mass, per 100 parts by mass of the polymer represented by general formula (3) above because this ensures effective hydrolysis.

If the group having the ester bond is a phenylalkoxycarbonyl group, such as the benzyloxycarbonyl group, the conversion into carboxyl groups can be achieved through reduction by hydrogenation. For the reaction conditions in this case, the phenylalkoxycarbonyl groups can be quantitatively regenerated into carboxyl groups by reacting them with hydrogen gas as a reducing agent in the presence of a palladium catalyst, such as palladium acetate, at room temperature.

As stated, the reaction conditions for conversion into carboxyl groups vary depending on what type of group has the ester bond. A polymer obtained by copolymerizing t-butyl (meth)acrylate and n-butyl (meth)acrylate as raw materials for $A^3$, for example, has t-butoxycarbonyl groups and n-butoxycarbonyl groups. Because of the variability in reaction conditions, acidic conditions that hydrolyze the t-butoxycarbonyl groups do not hydrolyze the n-butoxycarbonyl groups, and this means it is possible to hydrolyze only the t-butoxycarbonyl groups selectively and deprotect them into carboxyl groups. The acid value of the hydrophilic block ($A^3$) can therefore be adjusted by selecting appropriate monomers including (meth)acrylates having protected groups that can be regenerated into anionic groups as raw material monomers for $A^3$.

In a polymer (A) represented by general formula (3) above, clear separation between polymer blocks ($A^2$) and ($A^3$) is more advantageous than otherwise to the stability of the resulting water-based pigment dispersion. Preferably, the molar ratio $A^2:A^3$ between polymer blocks ($A^2$) and ($A^3$) is between 100:10 and 100:500. If the proportion of $A^3$ is below 10 per 100 of $A^2$, the black pigment ink (a) tends to be inferior in the stability of the pigment dispersed therein and ejection stability in inkjet ejection. If the proportion of $A^3$ exceeds 500 per 100 of $A^2$, too high a hydrophilicity of the polymer causes the black pigment ink (a) to penetrate easily into the recording medium when the recording medium is paper or a similar material, affecting color strength. It is particularly preferred that the proportions $A^2:A^3=100:10$ to 100:450.

In a polymer (A) represented by general formula (3) above, furthermore, polymer block ($A^2$) is formed preferably by 5 to 40 monomers having an aromatic ring or heterocycle, more preferably 6 to 30 of such monomers, the most preferably 7 to 25 of such monomers. Polymer block ($A^3$) is formed preferably by 3 to 20 anionic groups, more preferably 4 to 17 anionic groups, the most preferably 5 to 15 anionic groups.

When expressed as the molar ratio between the number of moles having an aromatic ring or heterocycle in polymer block ($A^2$) and that of anionic groups forming ($A^3$), the molar ratio $A^2:A^3$ between polymer blocks ($A^2$) and ($A^3$) is preferably between 100:7.5 and 100:400.

The acid value of the polymer (A) represented by general formula (3) above is preferably between 40 and 400 mg KOH/g, more preferably between 40 and 300 mg KOH/g, the most preferably between 40 and 190 mg KOH/g. If the acid value is below 40 mg KOH/g, the black pigment ink (a) may be insufficient in the stability of the pigment dispersed therein and ejection stability in inkjet ejection. If the acid value exceeds 400 mg KOH/g, too high a hydrophilicity of the polymer causes the black pigment ink (a) to penetrate easily into the recording medium when the recording medium, affecting color strength. An acid value exceeding 190 mg KOH/g, furthermore, may have some impact on the waterproofness of the resulting ink in some cases.

It should be understood that the acid value of a polymer in the present invention is an acid value measured by the same method as in the measurement of fine particles of polymer (A) described above.

Preferably, the anionic groups in polymer (A) have been neutralized.

The basic compound used to neutralize the anionic groups in polymer (A) can be any known and commonly used one. Examples include inorganic basic substances, such as sodium hydroxide, potassium hydroxide, and other alkali metal hydroxides, and organic basic compounds, like ammonia, triethylamine, and alkanolamines.

In the present invention, the amount of neutralization of polymer (A) in the water-based pigment dispersion does not need to be 100% neutral with respect to the acid value of the polymer. Specifically, it is preferred that the anionic groups be neutralized so that the percentage neutralization of polymer (A) will be between 20% and 200%, more preferably between 80% and 150%.

The black pigment ink (a) can optionally be additives such as a binder resin, a urea additive as a humectant (drying retarder), a penetrant, a viscosity modifier, a pH-adjusting agent, a chelating agent, a plasticizer, an antioxidant, and/or an ultraviolet absorber.

Examples of binder resins include polyvinyl alcohol, gelatin, polyethylene oxides, polyvinylpyrrolidone, acrylic resins, urethane resins, dextran, dextrin, carrageenans (κ, τ, λ, etc.), agar, pullulan, water-soluble polyvinyl butyral, hydroxyethyl cellulose, and carboxymethyl cellulose. One or a combination of two or more of such binder resins can be used.

In particular, the use of an acrylic resin as a binder resin is preferred. Preferably, an acrylic resin having an amide group is used, in particular an acrylic resin having an amide group and an alkoxysilyl or similar group because of its superior redispersibility in water-based ink. It should be noted that "acrylic resin" refers to a polymer that contains a (meth)acryloyl-bearing monomer as one of its raw materials.

(Acrylic Resin Having an Amide Group)

The acrylic resin having an amide group is effective in improving redispersion of the black pigment ink (a) according to the present invention.

The acrylic resin having an amide group can be obtained by, for example, polymerizing monomer components including an acrylic monomer having an amide group. The use of the acrylic monomer having an amide group in an amount of 5% by mass or less of the total amount of the monomer components is preferred in obtaining better redispersibility and printed articles superior in abrasion resistance. Preferably, the acrylic monomer having an amide group is used in an amount of 0.5% by mass to 5% by mass, more preferably 0.5% by mass to 4% by mass, in particular 1.5% by mass to 3% by mass.

Examples of acrylic monomers having an amide group include (meth)acrylamide, N-methyl(meth)acrylamide, N-ethyl(meth)acrylamide, N-propyl(meth)acrylamide, N-methylol(meth)acrylamide, N-isopropyl(meth)acrylamide, N-butyl(meth)acrylamide, N,N-dimethyl(meth)acrylamide, N,N-diethyl(meth)acrylamide, N,N-dipropyl(meth)acrylamide, N,N-dimethylaminopropyl(meth)acrylamide, diacetone(meth)acrylamide, and hydroxyethyl(meth)acrylamide.

Examples of additional monomers, or monomers that can be used in combination with the acrylic monomer having an amide group, include acrylic monomers, such as (meth)

acrylic acid and its alkali metal salts and (meth)acrylate monomers, e.g., methyl (meth)acrylate, ethyl (meth)acrylate, butyl (meth)acrylate, 2-ethylhexyl (meth)acrylate, benzyl (meth)acrylate, and cyclohexyl (meth)acrylate, and (meth) acrylonitrile, 2-dimethylaminoethyl (meth)acrylate, and glycidyl (meth)acrylate.

Other examples of additional monomers include aromatic vinyl compounds, such as styrene, α-methylstyrene, p-tert-butylstyrene, vinylnaphthalene, and vinylanthracene, vinylsulfonic acid compounds, such as vinylsulfonic acid and styrenesulfonic acid, vinylpyridine compounds, such as 2-vinylpyridine, 4-vinylpyridine, and naphthylvinylpyridine, and vinyltriethoxysilane, vinyltrimethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

Preferably, the additional monomer is a monomer having an aromatic group, such as styrene or benzyl (meth)acrylate. This is preferred in further improving compatibility with the pigment.

Of such acrylic resins having an amide group, the use of an acrylic resin having an amide group and an alkoxysilyl or similar group is preferred in ensuring good ejection. It helps prevent the black pigment ink (a) from forming a coating by drying or coagulating near the nozzles used to eject it. With such a binder resin, furthermore, the coating disperses again in a new supply of the black pigment ink (a) even if formed.

The acrylic resin having an amide group and alkoxysilyl or similar group can be produced by, for example, polymerizing a monomer having an amide group as described above with a monomer having an alkoxysilyl or similar group, a so-called silane coupling agent.

Examples of silane coupling agents having an ethylenic unsaturated group include ones having an ethylenic unsaturated group, such as vinyltriethoxysilane, vinyltrimethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

The silane coupling agent having an ethylenic unsaturated group gives the acrylic resin having an amide group and an alkoxysilyl or similar group a crosslinked structure. Preferably, the silane coupling agent is used in an amount of 0.05% by mass to 2% by mass, more preferably 0.05% by mass to 1.5% by mass, of the total amount of the monomers used to produce the acrylic resin having an amide group and an alkoxysilyl or similar group. The use of 0.1% by mass to 1.0% by mass silane coupling agent is particularly preferred in ensuring the binder resin will develop its function of improving the abrasion resistance of printed articles as it leads to higher strength of dried coatings of applied ink.

To improve the adhesion of the black pigment ink (a) used in the present invention to the aforementioned nonabsorbent, low-absorbency, or similar recording medium, the acrylic resin may contain a component whose molecular weight is difficult to measure because it is insoluble in tetrahydrofuran (THF) as a developing solvent in the measurement of molecular weight by gel permeation chromatography.

Here, the component insoluble in THF as a developing solvent in the measurement of the molecular weight of acrylic resins by gel permeation chromatography can be deemed to have a number-average molecular weight of at least 100,000 and a mass-average molecular weight of at least 500,000.

If the black pigment ink (a) is one that contains such a binder resin, a raw material for its production can be an aqueous dispersion of the acrylic resin.

The aqueous dispersion of the acrylic resin can be, for example, a dispersion of the acrylic resin in water or a water-soluble solvent made using an emulsifier or a dispersion of an acrylic resin having a hydrophilic group in such a solvent, such as water.

Examples of emulsifiers include nonionic emulsifiers, such as polyoxyethylene alkyl ethers, polyoxyethylene alkylphenyl ethers, and polyoxyethylene polyoxypropylene copolymers, anionic emulsifiers, such as alkyl sulfates, alkylbenzene sulfonates, polyoxyethylene alkyl ether sulfates, and polyoxyethylene alkylphenyl ether sulfates, and cationic emulsifiers, such as quaternary ammonium salts. Preferably, the emulsifier is used in an amount of 20 parts by mass or less per 100 parts by mass of the acrylic resin, more preferably 5 parts by mass to 15 parts by mass because this makes the printed articles highly waterproof.

The aqueous dispersion of the acrylic resin can be produced by, for example, emulsification polymerization.

An example of emulsification polymerization is free-radical emulsification polymerization, which uses a free radical polymerization initiator.

Examples of free-radical polymerization initiators include persulfates, such as potassium persulfate, sodium persulfate, and ammonium persulfate, azo compounds, such as 2,2'-azobisisobutyronitrile and dimethyl-2,2'-azobisisobutyrate, organic peroxides, such as benzoyl peroxide and tert-butyl peroxy-2-ethylhexanoate, and redox initiators, which are combinations of an organic peroxide, such as cumene hydroperoxide, and a reducing agent, such as iron oxide. Preferably, the amount of free-radical polymerization initiator used is between 0.01 parts by mass and 5 parts by mass, more preferably between 0.05 parts by mass and 2 parts by mass, when it is assumed that the total mass of the monomers used to produce the acrylic resin is 100 parts by mass.

In the emulsification polymerization, agents such as a chain transfer agent and/or a pH-adjusting agent may optionally be used.

The emulsification polymerization, moreover, can be performed in 100 parts by mass to 500 parts by mass of water when it is assumed that the total mass of the monomers used to produce the acrylic resin is 100 parts by mass.

The emulsification polymerization can be performed over 0.1 to 10 hours, preferably in the temperature range of 5° C. to 100° C., more preferably 50° C. to 90° C.

As for the acrylic resin dispersion made by dispersing an acrylic resin having a hydrophilic group in water or a similar solvent, the acrylic resin can be one that has, for example, an anionic, cationic, or nonionic hydrophilic group.

Examples of anionic groups include the carboxyl, phosphoric acid, acidic phosphate, phosphorous acid, sulfonic acid, and sulfinic acid groups. The use of any such group neutralized with a basic compound is preferred.

Examples of basic compounds used in neutralizing the anionic group include methylamine, dimethylamine, trimethylamine, ethylamine, diethylamine, triethylamine, 2-aminoethanol, 2-dimethylaminoethanol, ammonia, sodium hydroxide, potassium hydroxide, tetramethylammonium hydroxide, tetra-n-butylammonium hydroxide, and trimethylbenzylammonium hydroxide.

Examples of cationic groups include the primary amino, secondary amino, tertiary amino, and ammonium hydroxide groups. Such groups neutralized with an acidic compound are preferred.

Examples of acidic compounds used in neutralizing the cationic group include formic acid, acetic acid, propionic acid, lactic acid, monomethyl phosphate, methanesulfonic acid, benzenesulfonic acid, dodecylbenzenesulfonic acid, hydrochloric acid, sulfuric acid, and nitric acid.

Examples of nonionic groups include ones having a polyether chain, such as polyoxyethylene and polyoxypropylene.

An acrylic resin having a hydrophilic group can be produced by, for example, polymerizing a monomer having a hydrophilic group together with a monomer having an amide group as described above and a silane coupling agent as described above.

Examples of monomers having a hydrophilic group include acrylic monomers having a carboxyl group, such as (meth)acrylic acid and 2-carboxyethyl (meth)acrylate, and their alkali metal salts, (meth)acrylamides having a tertiary amino group, such as N,N-dimethyl(meth)acrylamide, (meth)acrylates having a tertiary amino group, such as dimethylaminoethyl (meth)acrylate, and their quaternary derivatives. In particular, the use of (meth)acrylic acid or dimethylaminoethyl (meth)acrylate is preferred.

A dispersion of such an acrylic resin having a hydrophilic group can be produced by, for example, polymerizing the monomers mentioned above in an organic solvent to give an acrylic resin having a hydrophilic group and then dispersing the acrylic resin in water or a similar solvent.

Examples of organic solvents include aliphatic or alicyclic hydrocarbons, such as n-hexane, n-heptane, n-octane, cyclohexane, and cyclopentane; aromatic hydrocarbons, such as toluene, xylene, and ethylbenzene; esters, such as ethyl acetate, n-butyl acetate, n-amyl acetate, ethylene glycol monomethyl ether acetate, ethylene glycol monoethyl ether acetate, and ethylene glycol monobutyl ether acetate; alcohols, such as methanol, ethanol, iso-propanol, n-butanol, iso-butanol, ethylene glycol monomethyl ether, ethylene glycol monoethyl ether, ethylene glycol mono n-butyl ether, propylene glycol monomethyl ether, propylene glycol mono-n-propyl ether, and diethylene glycol monobutyl ether; ketones, such as acetone, methyl ethyl ketone, methyl isobutyl ketone, methyl n-amyl ketone, and cyclohexanone; ethers, such as dimethoxyethane, tetrahydrofuran, dioxane, ethylene glycol dimethyl ether, ethylene glycol dibutyl ether, diethylene glycol dimethyl ether, and diethylene glycol dibutyl ether; and N-methylpyrrolidone, dimethylformamide, dimethylacetamide, and ethylene carbonate. Such solvents can be used alone or as a combination of two or more.

Examples of free-radical polymerization initiators that can be used for polymerization in such organic solvents include azo compounds, such as 2,2'-azobis(isobutyronitrile) and 2,2'-azobis(2,4-dimethylvaleronitrile); and peroxides, such as tert-butyl peroxypivalate, tert-butyl peroxybenzoate, and tert-butyl peroxy-2-ethylhexanoate.

The resulting acrylic resin having a hydrophilic group is dispersed in an aqueous medium preferably by phase inversion emulsification.

Phase inversion emulsification is a method in which an acrylic resin is dispersed (emulsified via transfer) in water or a similar solvent by mixing a solution of the acrylic resin, optionally with its hydrophilic group neutralized with a basic or acidic compound, in an organic solvent with the water or similar solvent. The phase inversion emulsification may optionally be followed by the removal of the organic solvent. During the phase inversion emulsification, moreover, an emulsifier may optionally be used unless to the extent that it prevents the object of the present invention from being achieved.

The solvent for the dispersion of the acrylic resin can be water, a water-soluble solvent, or a mixture of them.

The particle diameter of the acrylic resin is not critical, but when the ease of ejection from an inkjet head is considered, acrylic resins with smaller diameters are preferred. For example, it is preferred that the acrylic resin have a volume-average particle diameter of 10 to 200 nm, for example as measured using "Nikkiso Co., Ltd. "Microtrac particle size analyzer "UPA-EX150."

To give the printed articles a high gloss and to reduce the clogging of the nozzles used to eject the ink, the binder resin, typically an acrylic resin as described above, is used preferably in an amount of 3% by mass to 15% by mass (on a solids basis) of the mass of the black pigment ink (a). The use of 5% by mass to 12% by mass binder resin is more preferred, in particular 7% by mass to 10% by mass.

The urea additive can be, for example, urea or a urea derivative. Urea and urea derivatives have a function as solid humectants by virtue of their high moisture retention capability. The urea additive therefore prevents the water-based ink from drying or coagulating near the nozzles used to eject it, thereby helping ensure good ejection of the ink.

A black pigment ink (a) containing such a urea additive, moreover, dries quickly after landing on the recording medium, for example upon heating. The use of a urea additive therefore helps prevent bleeding and color mixing more effectively, even in printing on a nonabsorbent, low-absorbency, or similar recording medium.

Examples of urea derivatives include ethylene urea, propylene urea, diethylurea, thiourea, N,N-dimethylurea, hydroxyethylurea, hydroxybutylurea, ethylene thiourea, and diethylthiourea. Two or more of these may be used together.

It is particularly preferred that the urea additive be urea, ethylene urea, or 2-hydroxyethylurea. These are highly soluble in water and readily available.

As for amount, the use of 1.0% by mass to 20.0% by mass urea additive, based on the mass of the black pigment ink (a), is preferred in improving the ejection of the ink and the drying of the printed articles. Preferably, the urea additive is used in an amount of 2.0% by mass to 15.0% by mass, more preferably 3.0% by mass to 10.0% by mass.

If a urea additive is used, it is preferred to use the urea additive in combination with a water-soluble organic solvent as mentioned above, which has a boiling point of 100° C. or more and 200° C. or less and a vapor pressure of 0.5 hPa or more at 20° C. Preferably, the water-soluble organic solvent and urea additive are used in an amount of 1% to 25% by mass, more preferably 3% to 20% by mass, of the mass of the black pigment ink (a). The use of 5% to 18% by mass water-soluble organic solvent and urea additive is particularly preferred because this ensures that even if a printed article is produced and the recording medium of another is placed on its print surface immediately thereafter, the ink is not easily transferred.

Furthermore, if the aforementioned set of propylene glycol and at least one organic solvent selected from glycerol, diglycerol, glycerol derivatives, and diglycerol derivatives is used, it is preferred that the total mass of the water-soluble organic solvent having a boiling point of 100° C. or more and 200° C. or less and a vapor pressure of 0.5 hPa or more at 20° C., the urea additive, propylene glycol, and the at least one organic solvent selected from the group consisting of glycerol, diglycerol, glycerol derivatives, and diglycerol derivatives be between 20% and 50% by mass, more preferably between 20% and 40% by mass, of the mass of the black pigment ink (a). The use of them in an amount of 22% to 35% by mass is particularly preferred because this ensures that even if a printed article is produced and the recording medium of another is placed on its print surface immediately thereafter, the ink is not easily transferred.

The humectant can be used to prevent the black pigment ink (a) from drying. Preferably, the humectant constitutes 3% by mass to 50% by mass of the total amount of the black pigment ink (a).

Considering miscibility with water and effectiveness in preventing the clogging of the head of an inkjet printer, examples of humectants include ethylene glycol, diethylene glycol, triethylene glycol, polyethylene glycols having a molecular weight of 2000 or less, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, mesoerythritol, and pentaerythritol. The use of 1,3-butyl glycol is preferred because it is highly safe and leads to good drying and ejection performance of the black pigment ink (a).

The humectant can be used to improve penetration into the recording medium and to adjust the diameter of dots on the recording medium.

Examples of humectants include lower alcohols, such as ethanol and isopropyl alcohol, ethylene oxide adducts of alkyl alcohols, such as ethylene glycol hexyl ether and diethylene glycol butyl ether, and propylene oxide adducts of alkyl alcohols, such as propylene glycol propyl ether. The use of 0.01% by mass to 10% by mass humectant, based on the total mass of the black pigment ink (a), is preferred.

The black pigment ink (a) can be produced by, for example, mixing the pigment and water, which are essential ingredients, optionally with a surfactant, a resin for dispersing the resin, a binder resin, etc., by stirring and then dispersing and milling, for example, the materials using dispersing and milling machines, such as a bead mill, an ultrasonic homogenizer, a high-pressure homogenizer, a paint shaker, a ball mill, a roll mill, a sand mill, a sand grinder, a DYNO-MILL, an SC Mill, and a Nanomizer.

The black pigment ink (a) produced in this way may then be centrifuged or filtered.

(Pigment Ink (b))

In the ink set according to the present invention, the pigment ink (b), used in combination with the black pigment ink (a), has a static surface tension smaller than the static surface tension (a1) of the black pigment ink (a) by 0.1 mN/m to 0.5 mN/m.

A pigment ink (b) can be one that contains a surfactant, water, an organic solvent, and polymer (A) or any other resin for dispersing the pigment as described by way of example as possible ingredients of the black pigment ink (a), optionally with materials like a binder resin, a urea additive, a neutralizing agent, etc.

A pigment ink (b) can also be produced by the same method as that described by way of example as a method for producing the black pigment ink (a).

Pigments with which a pigment ink (b) can be produced include organic or inorganic pigments.

Examples of organic pigments that can be used include azo pigments (including azo lake, insoluble azo pigments, condensed azo pigments, chelate azo pigments, etc.), polycyclic pigments (e.g., phthalocyanine, perylene, perinone, anthraquinone, quinacridone, dioxazine, thioindigo, isoindolinone, and quinophthalone pigments), lake pigments (e.g., chelates of basic dye type or acidic dye type), nitro pigments, nitroso pigments, and aniline black.

Examples of pigments that can be used in yellow pigment ink include C.I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, and 185.

Examples of pigments that can be used in magenta pigment ink include C.I. Pigment Red 5, 7, 12, 48 (Ca), 48 (Mn), 57 (Ca), 57:1, 112, 122, 123, 146, 168, 176, 184, 185, 202, 209, 269, and 282 and C.I. Pigment Violet 19.

Examples of pigments that can be used in cyan pigment ink include C.I. Pigment Blue 1, 2, 3, 15, 15:3, 15:4, 16, 22, 60, 63, and 66.

The pigment, moreover, can be a pigment that has yet to be treated with acid or a pigment that has been treated with acid.

The method used to adjust the static surface tension of a pigment ink (b) can be the same method as that used to adjust the static surface tension of the black pigment ink (a). For example, the customization of the type and amount of surfactant is preferred because it is easy and convenient.

The surfactant is preferably of the same kind as that used in the black pigment ink (a) or one that has comparable potential for reducing surface tension.

If the surfactant is of the same kind as that used in the black pigment ink (a) or one that has comparable potential for reducing surface tension, it is desirable that the amount of surfactant in the pigment ink (b) be greater than that in the black pigment ink (a) so that the static surface tension of the pigment ink (b) will be smaller than the static surface tension (a1) of the black pigment ink (a) by 0.1 mN/m to 0.5 mN/m.

As stated, however, if the black pigment ink (a) and a pigment ink (b) are made with the same kind of surfactant or surfactants having similar potential for reducing surface tension, the static surface tension of the pigment ink (b) is not always in the range specified above even if the amount of surfactant in the pigment ink (b) is greater than that in the black pigment ink (a). This is because the compatibility of pigments in inks with a given surfactant varies.

In that case, as stated, it is preferred that the surfactant be used in an amount appropriate for the type of pigment.

An example is a case in which the black pigment ink (a) and the pigment ink (b) are an acetylene surfactant, such as acetylene glycol or an oxyethylene adduct of acetylene glycol. When it is assumed that the total acetylene surfactant content of the black pigment ink (a) is 1 in this case, it is preferred to adjust the surfactant content so that the total surfactant content (proportion by mass) of a cyan pigment ink that can be used as a pigment ink (b) will be between 0.5 and 1.5, in particular between 0.8 and 1.2. It is preferred to adjust the surfactant content so that the total surfactant content (proportion by mass) of a magenta pigment ink that can be used as a pigment ink (b) will be between 0.5 and 1.5, in particular between 0.8 and 1.2. It is preferred to adjust the surfactant content so that the total surfactant content (proportion by mass) of a yellow pigment ink that can be used as a pigment ink (b) will be between 0.5 and 1.5, in particular between 0.8 and 1.2.

The ink set according to the present invention can be one composed essentially of the black pigment ink (a) and pigment ink (b) and optionally of inks other than the black pigment ink (a) and pigment ink (b). As stated, the pigment ink (b) can be one or both of a magenta pigment ink and a yellow pigment ink. The ink set according to the present invention therefore only needs to be composed of at least two inks, with no upper limit.

In the ink set according to the present invention, the difference in static surface tension between the ink having the largest static surface tension and that having the smallest is preferably between 0.1 mN/m and 2.0 mN/m. A difference of 0.3 mN/m to 1.0 mN/m is more preferred in ensuring the ink set will bring the advantage of reduced bleeding and color mixing.

In the ink set according to the present invention, the ink having the largest static surface tension may be the black pigment ink (a) or may be an optional cyan pigment ink. The ink having the smallest sexual surface tension is preferably a yellow pigment ink.

The ink set according to the present invention can be used for printing on a recording medium that absorbs ink well, such as copying paper commonly used with photocopiers (multipurpose copy paper), a recording medium having a layer for absorbing ink, a nonabsorbent recording medium, which absorbs no ink, or a low-absorbency recording medium, which absorbs little ink. Of particular note is that the ink set according to the present invention helps obtain printed articles with reduced bleeding and color mixing even in printing on a recording medium that absorbs no or little ink.

For the low-absorbent recording medium, the use of a recording medium that absorbs 10 $g/m^2$ or less water when brought into contact with water for 100 msec in combination with the ink set according to the present invention is preferred in obtaining printed articles with reduced bleeding and color mixing.

This water absorption is that during 100 msec determined by measuring transfer during contact with pure water for 100 ms under the conditions of 23° C. and a relative humidity of 50% using an automatic scanning liquid absorptiometer (KM500win, Kumagai Riki Kogyo, Co., Ltd.). The conditions for measurement were as follows.

[Spiral Method]
  Contact Time: 0.010 to 1.0 (sec)
  Pitch: 7 (mm)
  Length per sampling: 86.29 (degrees)
  Start Radius: 20 (mm)
  End Radius: 60 (mm)
  Min Contact Time: 10 (ms)
  Max Contact Time: 1000 (ms)
  Sampling Pattern: 50
  Number of sampling points: 19
[Square Head]
  Slit Span: 1 (mm)
  Width: 5 (mm)

Examples of recording media that absorb ink include ordinary printing paper, fabric, corrugated fiberboard, and wood. Examples of recording medium having an absorbing layer include dedicated inkjet paper, specifically paper such as K.K. Pictorico's Pictorico Pro photographic paper.

The low-absorbency recording medium, which absorbs little ink, can be, for example, corrugated fiberboard having a surface color layer that absorbs little solvent in inks, art paper, such as paper for commercial printing, coated paper, lightweight coated paper, or thinly coated paper.

Examples of low-absorbency recording media include wood-free paper, which is primarily cellulose and usually has an untreated surface, and recording media made by applying a coating material to the surface of, for example, acid-free paper to form a coating layer. Examples of such media that can be used include thinly coated paper, such as Oji Paper Co., Ltd.'s "OK Ever Light Coat" and Nippon Paper Industries Co., Ltd.'s "Aurora S," lightweight coated paper (A3), such as Oji Paper Co., Ltd.'s "OK Coat L" and Nippon Paper Industries Co., Ltd.'s "Aurora L," coated paper (A2 or B2), such as Oji Paper Co., Ltd.'s "OK Top Coat+(grammage, 104.7 $g/m^2$; water absorption during contact for 100 msec (the same applies whenever water absorption is mentioned hereinafter), 4.9 $g/m^2$)," Nippon Paper Industries Co., Ltd.'s "Aurora Coat," and UPM's Finesse Gloss (UPM; 115 $g/m^2$; water absorption, 3.1 $g/m^2$) and Finess Matt (115 $g/m^2$; water absorption, 4.4 $g/m^2$), art paper (A1), such as Oji Paper Co., Ltd.'s "OK Kinfuji+" and Mitsubishi Paper Mills Ltd.'s "Tokubishi Art," and plastic film. Examples of plastic films include polyester films, for example made of polyethylene terephthalate or polyethylene naphthalate, polyolefin films, for example made of polyethylene or polypropylene, polyamide films, for example made of nylon, polystyrene films, polyvinyl alcohol films, polyvinyl chloride films, polycarbonate films, polyacrylonitrile films, and polylactic acid films. Preferably, the plastic film is polyester film, polyolefin film, or polyamide film, preferably polyethylene terephthalate film, polypropylene film, or nylon film.

Alternatively, the plastic film may be a film with a coating thereon, for example of polyvinylidene chloride, for imparting barrier properties or a film having a metal layer, for example of aluminum, or a deposited layer of metal oxide, such as silica or alumina.

The plastic film may be a cast film, but it may alternatively be a uniaxially or biaxially oriented one. The surface of the film, moreover, may be untreated, but preferably has been treated for improved adhesion, for example with a corona discharge, ozone, low-temperature plasma, flames, or a glow discharge.

The thickness of the plastic film is changed to be appropriate for its intended use. For example, if the intended use is for flexible packaging, it is preferred that the plastic film have a thickness of 10 μm to 100 μm to be flexible, durable, and unlikely to curl. More preferably, the thickness is between 10 μm to 30 μm. Specific examples of these include Toyobo Co., Ltd.'s PYLEN® and ESPET®.

Of such recording media, the ink set according to the present invention is suitable for use in printing on, for example, corrugated fiberboard made entirely of cardboard that absorbs much solvent in inks or corrugated fiberboard having a color layer that absorbs little solvent in inks on the surface of the cardboard.

The corrugated fiberboard can be, for example, one composed of a corrugated fluting and a liner attached to one or both sides thereof. For example, it can be a single-face board, single-wall board, double-wall board, or triple-wall board.

Specifically, the ink set is suitable for use in printing on, for example, corrugated fiberboard made entirely of cardboard that absorbs much solvent in inks or corrugated fiberboard having a color layer that absorbs little solvent in inks, waterproof layer, or similar layer on the surface of the cardboard. Even if the recording medium is a nonabsorbent or poorly absorbent one, such as corrugated fiberboard having a color layer that absorbs little solvent in inks, waterproof layer, or similar layer on the surface of cardboard, the inks according to the present invention help prevent streaks on the printed articles effectively. The inks wet and spread well on the surface of the recording medium after landing on it.

When the ink set according to the present invention is applied to inkjet printing on such a type of corrugated fiberboard, streaks on the printed articles are effectively prevented even if the distance from the surface (x) on which the inkjet device has ink orifices to the point (y) where a perpendicular to the surface (x) meets the recording medium is 2 mm or more. The inks wet and spread sufficiently after landing on the recording medium.

Of the aforementioned types of corrugated fiberboard, the corrugated fiberboard having a color, waterproof, or similar layer on its surface can be one made by applying a color or waterproof agent to the surface, formed by cardboard, of the corrugated fiberboard, for example by curtain coating or roll coating, to form a coating.

An example of a color layer is one having a whiteness of 70% or more.

Preferably, the color, waterproof, or similar layer of the corrugated fiberboard is such that when the recording surface of the recording medium, for example the corrugated fiberboard, is brought into contact with water for 100 msec, the recording medium absorbs 10 g/m$^2$ or less water. This is preferred in ensuring the layer will render the printed articles waterproof.

An example of a method for producing a printed article using the ink set according to the present invention is a method in which an ink set that is a combination of a black pigment ink (a), magenta and yellow pigment inks as pigment inks (b), and a cyan pigment ink different from them is ejected onto a recording medium by inkjet recording to give a printed article through a step of ejecting the black pigment ink (a), the cyan pigment ink, and then the magenta and yellow pigment inks to the recording medium using an inkjet recording device. For the ink set used, the combination of a magenta pigment ink that has a static surface tension smaller than static surface tension (a1) by 0.1 mN/m to 0.7 mN/m, preferably by 0.1 mN/m to 0.5 mN/m, preferably by 0.1 mN/m to 0.3 mN/m, a yellow pigment ink that has a static surface tension smaller than that of the magenta pigment ink by 0.1 mN/m to 0.5 mN/m, and a cyan pigment ink with any static surface tension is preferred in ensuring the ink set will bring the advantage of reduced bleeding and color mixing.

Another example of a method for producing a printed article using the ink set according to the present invention is a method in which an ink set that is a combination of a black pigment ink (a), magenta and yellow pigment inks as pigment inks (b), and a cyan pigment ink different from them is ejected onto a recording medium by inkjet recording to give a printed article through a step of ejecting the cyan pigment ink, the black pigment ink (a), and then the magenta and yellow pigment inks to the recording medium using an inkjet recording device. For the ink set used, the combination of a magenta pigment ink that has a static surface tension smaller than static surface tension (a1) by 0.1 mN/m to 0.7 mN/m, preferably by 0.1 mN/m to 0.5 mN/m, preferably by 0.1 mN/m to 0.3 mN/m, a yellow pigment ink that has a static surface tension smaller than that of the magenta pigment ink 0.1 mN/m to 0.7 mN/m, preferably by 0.1 mN/m to 0.5 mN/m, preferably by 0.1 mN/m to 0.3 mN/m, and a cyan pigment ink with any static surface tension is preferred in ensuring the ink set will bring the advantage of reduced bleeding and color mixing.

EXAMPLES

The following describes the present invention in further detail by examples.
(Preparation of Polymer (P-1))

Synthesis Example 1

A solution of BuLi in hexane and a solution of styrene, prepared beforehand by dissolving styrene in tetrahydrofuran, were introduced from tube reactors P1 and P2 in FIG. 1 into T-shaped micromixer M1. Living anionic polymerization was performed, giving a polymer.

The polymer obtained in the above step was then moved through tube reactor R1 in FIG. 1 to T-shaped micromixer M2. The growth end of the polymer was trapped with a reaction regulator introduced from tube reactor P3 (α-methylstyrene (α-MeSt)).

Then a solution of tert-butyl methacrylate, prepared beforehand by dissolving tert-butyl methacrylate in tetrahydrofuran, was introduced tube reactor P4 in FIG. 1 to T-shaped micromixer M3. The tert-butyl methacrylate was polymerized with the trapped polymer moved through tube reactor R2 by living anionic polymerization as continuous polymerization. After that, the living anionic polymerization was quenched by feeding methanol. In this way, a block copolymer (PA-1) composition was produced.

In the production of the block copolymer (PA-1) composition, the entire microreactor illustrated in FIG. 1 was immersed in a thermostat bath to set the reaction temperature to 24° C.

Obtained in this way, block copolymer (PA-1) was formed by the following monomers in the following molar ratios: (BuLi/styrene/α-methylstyrene/tert-butyl methacrylate) =1.0/12.0/2.0/8.1.

The resulting block copolymer (PA-1) composition was hydrolyzed by treatment with a cation-exchange resin, the solvent was removed by distillation under reduced pressure, and the resulting solid was milled to give powdery polymer (P-1).

The characteristics of the resulting polymer (P-1) were measured as follows.
(Measurement of the Number-Average Molecular Weight (Mn))

The number-average molecular weight was measured by gel permeation chromatography (GPC) under the following conditions.

Measuring instrument: A high-performance GPC system (Tosoh Corporation "HLC-8220GPC")

Columns: The following columns, available from Tosoh Corporation, were used in series connection.
One "TSKgel G5000" column (7.8 mm I.D.×30 cm)
One "TSKgel G4000" column (7.8 mm I.D.×30 cm)
One "TSKgel G3000" column (7.8 mm I.D.×30 cm)
One "TSKgel G2000" column (7.8 mm I.D.×30 cm)
Detector: An RI (refractive index detector)
Column temperature: 40° C.
Eluent: Tetrahydrofuran
Flow rate: 1.0 mL/min
Injection volume: 100 μL (solution of 0.4% by mass sample in tetrahydrofuran)
Reference samples: The standard polystyrenes listed below were used to create a calibration curve.
(Standard Polystyrenes)
Tosoh Corporation "TSKgel Standard Polystyrene A-500"
Tosoh Corporation "TSKgel Standard Polystyrene A-1000"
Tosoh Corporation "TSKgel Standard Polystyrene A-2500"
Tosoh Corporation "TSKgel Standard Polystyrene A-5000"
Tosoh Corporation "TSKgel Standard Polystyrene F-1"
Tosoh Corporation "TSKgel Standard Polystyrene F-2"
Tosoh Corporation "TSKgel Standard Polystyrene F-4"
Tosoh Corporation "TSKgel Standard Polystyrene F-10"
Tosoh Corporation "TSKgel Standard Polystyrene F-20"
Tosoh Corporation "TSKgel Standard Polystyrene F-40"

Tosoh Corporation "TSKgel Standard Polystyrene F-80"
Tosoh Corporation "TSKgel Standard Polystyrene F-128"
Tosoh Corporation "TSKgel Standard Polystyrene F-288"
Tosoh Corporation "TSKgel Standard Polystyrene F-550"
(Measurement of Acid Value)

The acid value was measured in accordance with JIS Test Method K 0070-1992. A 0.5-g sample was dissolved in tetrahydrofuran, and the acid value was determined by titration with a 0.1 M alcohol solution of potassium hydroxide using phenolphthalein as an indicator.

(Measurement of Solubility in Water)

Particles of the polymer were sieved to a diameter of 250 μm to 90 μm through screens with a pore size of 250 μm and 90 μm, and 0.5 g of the sieved polymer was sealed in a bag made from a 400-mesh metal sheet. The bag was immersed in 50 ml of water and left with gentle stirring for 24 hours at a temperature of 25° C. After the 24-hour immersion, the 400-mesh metal sheet containing the polymer was dried for 2 hours in a drying oven set to 110° C. The change in the weight of the 400-mesh metal sheet containing the polymer from before to after immersion in water was measured, and the solubility was calculated in accordance with the following equation.

Solubility (g/100 ml)=(400-Mesh metal sheet containing the polymer before immersion (g)−400-Mesh metal sheet containing the polymer after immersion (g))×2    [Math. 3]

(Determination of Whether the Polymer Forms Fine Particles in Water and Measurement of the Volume-Average Particle Diameter (Nm))

(1) The acid value of the polymer is measured as in the above measurement of acid value.

(2) One gram of the polymer is added to 50 ml of water, and a 0.1 mol/L aqueous solution of potassium hydroxide is added enough for 100% neutralization of the acid value determined in (1), making the solution 100% neutral.

(3) The 100% neutralized solution is sonicated in an ultrasonicator (SND Co., Ltd. US-102 ultrasonicator, 38-kHz self-excited vibrations) for 2 hours at a temperature of 25° C. for dispersion and then is left for 24 hours at room temperature.

After being left, the solution was sampled at a depth of 2 centimeters from its surface, and the sample solution was analyzed using a dynamic-light-scattering particle size distribution analyzer (Nikkiso Co., Ltd.'s dynamic-light-scattering particle size analyzer "Microtrac UPA-ST150 particle size distribution analyzer"). Whether fine particles were present was checked on the basis of light-scattering data. If fine particles were present, their volume-average diameter was measured.

(Measurement of Static Surface Tension)

A sample solution was obtained in the same way as that used in the above determination of whether the polymer forms fine particles in water, and its static surface tension was measured using a Wilhelmy surface tensiometer.

Table 1 presents the raw materials, reaction conditions, and characteristics for the polymer obtained in the above synthesis example.

TABLE 1

|  |  | Synthesis Example 1 |
|---|---|---|
| Polymer (X) |  | P-1 |
| Reaction temperature |  | 24° C. |
| Polymerization initiator | Species | BuLi |

TABLE 1-continued

|  |  | Synthesis Example 1 |
|---|---|---|
| First monomer | Moles | 1.0 |
|  | Species | St |
|  | Moles | 12.0 |
| Reaction regulator | Species | α-MeSt |
|  | Moles | 2.0 |
| Second monomer | Species | tBMA |
|  | Moles | 8.1 |
| Molar ratio between the polymer block formed by the first monomer ($A^2$) and that formed by the second monomer ($A^3$) | $A^2:A^3=$ | 100:76 |
| Number-average molecular weight |  | 2471 |
| Acid value | mg KOH/g | 148 |
| Solubility in water (g/100 ml) |  | 0.0056 |
| Fine particles when 100% neutralization/Volume-average particle diameter (nm) |  | Yes/48 |
| Static surface tension (dyn/cm) |  | 67.7 |

In Table 1, BuLi represents normal butyllithium, St represents styrene, DPE represents 1,1-diphenylethylene, α-MeSt represents α-methylstyrene, and tBMA represents tert-butyl methacrylate.

Production Example 1; Production of Water-Based Pigment Dispersion (C-1)

A 1.0-L intensive mixer (Nippon Eirich Co., Ltd.) was loaded with 150 parts by mass of FASTOGEN BLUE phthalocyanine pigment (DIC Corporation: C.I. Pigment 15:3) as a pigment, 45 parts by mass of polymer (P-1), 150 parts by mass of triethylene glycol, and 20 parts by mass of a 34% by mass aqueous solution of potassium hydroxide, and the materials were milled for 25 minutes at a rotor circumferential speed of 2.94 m/s and a pan circumferential speed of 1 m/s.

Then 450 parts by mass of ion exchange water was gradually added, with continued stirring of the milled substance in the chamber of the intensive mixer. The mixture was then mixed with another 185 parts by mass of ion exchange water, giving water-based pigment dispersion (C-1) with a pigment concentration of 15% by mass.

Production Examples 2 to 4; Production of Water-Based Pigment Dispersion

Water-based pigment dispersion was obtained in the same way as in Production Example 1. The raw materials and proportions were those presented in Table 2.

TABLE 2

|  | Production Example 1 | Production Example 2 | Production Example 3 | Production Example 4 |
|---|---|---|---|---|
| Water-based pigment dispersion | C-1 | K-1 | M-1 | Y-1 |
| Pigment | PB15:3 | PB7 | PR122 | PY74 |
| Pigment (parts by mass) | 150 | 150 | 150 | 150 |
| Polymer (A) | P-1 | P-1 | P-1 | P-1 |
| Polymer (A) (parts by mass) | 45 | 45 | 30 | 45 |
| Polymer (A) acid value | 148 | 148 | 148 | 148 |
| Polymer (A)/pigment (ratio by mass) | 0.3 | 0.3 | 0.2 | 0.3 |

TABLE 2-continued

|  | Production Example 1 | Production Example 2 | Production Example 3 | Production Example 4 |
|---|---|---|---|---|
| Organic solvent | TEG | TEG | TEG | TEG |
| Organic solvent (parts by mass) | 150 | 135 | 150 | 150 |
| 34% by mass aqueous solution of potassium hydroxide (parts by mass) | 20 | 20 | 20 | 20 |
| Ion exchange water (parts by mass) | 450 | 450 | 450 | 450 |
| Ion exchange water (parts by mass) | 185 | 140 | 185 | 185 |

In Table 3, PB15:3 represents FASTOGEN BLUE phthalocyanine pigment, PB7 represents Pigment Black 7, PR122 represents Pigment Red 122, PY74 represents Pigment Yellow 74, and TEG represents triethylene glycol.

(Synthesis of a Binder Resin)

Synthesis Example 2

A four-neck flask equipped with a stirrer, a thermometer, a condenser, and a nitrogen tube was loaded with 16 g of "Newcol 707SF" (Nippon Nyukazai Co., Ltd.'s anionic emulsifier), 6.5 g of "NOIGEN TDS-200D" (DKS Co., Ltd.'s nonionic emulsifier), and 220 g of deionized water.

The mixture was heated to 80° C. under a nitrogen stream, and then an aqueous solution of 0.8 g of ammonium persulfate in 16 g of deionized water was added. Then a mixture of 60 g of 2-ethylhexyl acrylate, 100 g of styrene, 27 g of methyl methacrylate, 0.4 g of 3-methacryloxypropyltrimethoxysilane, 3 g of acrylamide, and 6 g of methacrylic acid was added dropwise over 3 hours. After the end of addition, the compounds were allowed to react for 2 hours, the product was cooled to 25° C. and neutralized with 1.5 g of 28% by mass aqueous ammonia, and deionized water was added to give aqueous dispersion of acrylic resin (X-1) with a glass transition temperature (Tg) of 35° C. and an average particle diameter of 50 nm. The solids concentration of acrylic resin dispersion (X-1) was 39% by mass.

(Preparation of Water-Based Inks)

Preparation Example 1; Preparation of Water-Based Ink

A 37.5-g sample of water-based pigment dispersion (K-1) was stirred with 6.0 g of MB (Daicel Corporation's 3-methoxy-1-butanol), 4.0 g of propylene glycol, 9.0 g of glycerol, 0.8 g of triethylene glycol, 2.0 g of SC-P1000 (Sakamoto Yakuhin Kogyo Co., Ltd.'s polyoxypropylene (14) polyglyceryl ether), 5.62 g of ethylene urea, 0.2 g of triethanolamine, 2.4 g of SURFYNOL 104PG50 (Air Products' acetylene glycol surfactant), 0.012 g of TEGO Wet KL245 (polyether-modified siloxane copolymer, Tomoe Engineering Co., Ltd.), 0.1 g of ACTICIDE B-20 (preservative, Thor Japan Ltd.), 11.3 g of aqueous dispersion of acrylic resin (X-1), obtained in Synthesis Example 2, and 21.1 g of ion exchange water, giving water-based ink (J1).

Preparation Examples 2 to 8; Preparation of Water-Based Ink

Water-based inks (J2) to (J8) were obtained in the same way as in Preparation Example 1, except that the water-based pigment dispersion and the ink formula were changed as in Tables 2 and 3.

Comparative Preparation Examples 1 to 8; Preparation of Water-Based Ink

Water-based inks (H1) to (H5) were obtained in the same way as in Preparation Example 1, except that the ink formula was changed to those in Table 3.

TABLE 3

| | | Example 1 | | | |
|---|---|---|---|---|---|
| Ink | | J1 | J2 | J3 | J4 |
| Water-based pigment dispersion | K-1 (g) | 37.5 | | | |
| | C-1 (g) | | 42.3 | | |
| | M-1 (g) | | | 47.6 | |
| | Y-1 (g) | | | | 42.9 |
| Organic solvents | 3MB (g) | 6.0 | 4.0 | 1.0 | 1.0 |
| | PG (g) | 4.0 | 12.0 | 8.5 | 16.0 |
| | GLY (g) | 9.0 | 8.0 | 8.0 | 4.0 |
| | TEG (g) | 0.8 | 0.2 | 0.7 | 0.6 |
| | SC-P1000 (g) | 2.0 | | | |
| Urea additive | Ethylene urea (g) | 5.6 | 5.6 | 5.6 | 5.6 |
| Additives | TEA (g) | 0.2 | 0.2 | 0.2 | 0.2 |
| | SF104PG50 (g) | 2.4 | 2.0 | 2.4 | 2.3 |
| | KL-245 (g) | 0.012 | 0.012 | 0.012 | 0.012 |
| | B-20 (g) | 0.1 | 0.1 | 0.1 | 0.1 |
| Binder resin | Aqueous dispersion of acrylic resin (X-1) (g) | 11.3 | 11.3 | 11.3 | 11.3 |
| Ion exchange water (g) | | 21.1 | 14.3 | 14.6 | 16.0 |
| Total (g) | | 100.012 | 100.012 | 100.012 | 100.012 |
| Static surface tension (mN/m) | | 28.90 | 29.10 | 28.70 | 28.50 |

TABLE 4

| | | Example 2 | | | |
|---|---|---|---|---|---|
| Ink | | J5 | J6 | J7 | J8 |
| Water-based pigment dispersion | K-1 (g) | 16.8 | | | |
| | C-1 (g) | | 17.1 | | |
| | M-1 (g) | | | 16.8 | |
| | Y-1 (g) | | | | 18.5 |
| Organic solvents | 3MB (g) | | | | |
| | PG (g) | 12.2 | 14.1 | 10.4 | 9.9 |
| | GLY (g) | 16.0 | 16.0 | 16.0 | 16.0 |
| | TEG (g) | | | | |
| | SC-P1000 (g) | | | | |
| Urea additive | Ethylene urea (g) | 5.6 | 5.6 | 5.6 | 5.6 |
| Additives | TEA (g) | 0.2 | 0.2 | 0.2 | 0.2 |
| | SF104PG50 (g) | 2.3 | 1.9 | 2.3 | 2.4 |
| | KL-245 (g) | 0.012 | 0.012 | 0.012 | 0.012 |
| | B-20 (g) | 0.1 | 0.1 | 0.1 | 0.1 |
| Binder resin | Aqueous dispersion of acrylic resin (X-1) (g) | 9.0 | 9.0 | 9.0 | 9.0 |
| Ion exchange water (g) | | 37.8 | 36.0 | 39.6 | 38.3 |
| Total (g) | | 100.012 | 100.012 | 100.012 | 100.012 |
| Static surface tension (mN/m) | | 27.70 | 27.90 | 27.50 | 27.30 |

TABLE 5

| | | Example 3 | | | |
|---|---|---|---|---|---|
| Ink | | J9 | J10 | J11 | J12 |
| Water-based pigment dispersion | K-1 (g) | 20.6 | | | |
| | C-1 (g) | | 25.9 | | |
| | M-1 (g) | | | 26.1 | |
| | Y-1 (g) | | | | 28.0 |
| Organic solvents | PG (g) | 9.8 | 9.6 | 15.0 | 7.7 |
| | GLY (g) | 10.0 | 10.0 | 10.0 | 10.0 |
| | MMB (g) | 4.0 | 4.0 | | 4.0 |
| | MPD (g) | 4.0 | 4.0 | | 4.0 |
| | SC-P1000 (g) | | | | |
| Urea additive | Ethylene urea (g) | 5.6 | 5.6 | 5.6 | 5.6 |
| Additives | TEA (g) | 0.2 | 0.2 | 0.2 | 0.2 |
| | SF420 (g) | 1.1 | 1.3 | 1.0 | 1.5 |
| | KL-245 (g) | 0.012 | 0.012 | 0.012 | 0.012 |
| | B-20 (g) | 0.1 | 0.1 | 0.1 | 0.1 |
| Binder resin | Aqueous dispersion of acrylic resin (X-1) (g) | 14.9 | 14.9 | 14.9 | 14.9 |
| Ion exchange water (g) | | 29.7 | 24.4 | 27.1 | 24.0 |
| Total (g) | | 100.012 | 100.012 | 100.012 | 100.012 |
| Static surface tension (mN/m) | | 29.76 | 29.52 | 29.38 | 29.19 |

TABLE 6

| | | Comparative Example 1 | | | |
|---|---|---|---|---|---|
| Ink | | H1 | H2 | H3 | H4 |
| Water-based pigment dispersion | K-1 (g) | 36.9 | | | |
| | C-1 (g) | | 42.9 | | |
| | M-1 (g) | | | 46.3 | |
| | Y-1 (g) | | | | 44.3 |
| Organic solvents | 3MB (g) | 6.0 | 4.0 | 4.0 | 1.0 |
| | PG (g) | 4.0 | 12.0 | 6.0 | 16.0 |
| | GLY (g) | 9.0 | 8.0 | 8.0 | 4.0 |
| | TEG (g) | 1.0 | 0.7 | 0.8 | 0.4 |
| | SC-P1000 (g) | 2.0 | | | |
| Urea additive | Ethylene urea (g) | 5.6 | 5.6 | 5.6 | 5.6 |
| Additives | TEA (g) | 0.2 | 0.2 | 0.2 | 0.2 |
| | SF104PG50 (g) | 2.4 | 2.0 | 2.5 | 2.3 |
| | KL-245 (g) | 0.012 | 0.012 | 0.012 | 0.012 |
| | B-20 (g) | 0.1 | 0.1 | 0.1 | 0.1 |
| Binder resin | Aqueous dispersion of acrylic resin (X-1) (g) | 11.3 | 11.1 | 11.1 | 11.2 |
| Ion exchange water (g) | | 21.5 | 13.4 | 15.4 | 14.9 |
| Total (g) | | 100.012 | 100.012 | 100.012 | 100.012 |
| Static surface tension (mN/m) | | 28.65 | 28.86 | 28.62 | 28.58 |

TABLE 7

| | | Comparative Example 2 | | | |
|---|---|---|---|---|---|
| Ink | | H5 | H2 | H3 | H4 |
| Water-based pigment dispersion | K-1 (g) | 36.9 | | | |
| | C-1 (g) | | 42.9 | | |
| | M-1 (g) | | | 46.3 | |
| | Y-1 (g) | | | | 44.3 |
| Organic solvents | 3MB (g) | 6.0 | 4.0 | 4.0 | 1.0 |
| | PG (g) | 4.3 | 12.0 | 6.0 | 16.0 |
| | GLY (g) | 9.0 | 8.0 | 8.0 | 4.0 |
| | TEG (g) | 1.0 | 0.7 | 0.8 | 0.4 |
| | SC-P1000 (g) | 2.0 | | | |
| Urea additive | Ethylene urea (g) | 5.6 | 5.6 | 5.6 | 5.6 |
| Additives | TEA (g) | 0.2 | 0.2 | 0.2 | 0.2 |
| | SF104PG50 (g) | 2.1 | 2.0 | 2.5 | 2.3 |
| | KL-245 (g) | 0.012 | 0.012 | 0.012 | 0.012 |
| | B-20 (g) | 0.1 | 0.1 | 0.1 | 0.1 |
| Binder resin | Aqueous dispersion of acrylic resin (X-1) (g) | 11.3 | 11.1 | 11.1 | 11.2 |
| Ion exchange water (g) | | 21.5 | 13.4 | 15.4 | 14.9 |
| Total (g) | | 100.012 | 100.012 | 100.012 | 100.012 |
| Static surface tension (mN/m) | | 29.35 | 28.86 | 28.62 | 28.58 |

TABLE 8

| | | Comparative Example 3 | | | |
|---|---|---|---|---|---|
| Ink | | H6 | H7 | H8 | H9 |
| Water-based pigment dispersion | K-1 (g) | 20.6 | | | |
| | C-1 (g) | | 25.9 | | |
| | M-1 (g) | | | 26.1 | |
| | Y-1 (g) | | | | 28.0 |
| Organic solvents | PG (g) | 9.6 | 9.6 | 15.1 | 7.9 |
| | GLY (g) | 10.0 | 10.0 | 10.0 | 10.0 |
| | MMB (g) | 4.0 | 4.0 | | 4.0 |
| | MPD (g) | 4.0 | 4.0 | | 4.0 |
| | SC-P1000 (g) | | | | |
| Urea additive | Ethylene urea (g) | 5.6 | 5.6 | 5.6 | 5.6 |
| Additives | TEA (g) | 0.2 | 0.2 | 0.2 | 0.2 |
| | SF420 (g) | 1.3 | 1.3 | 0.9 | 1.3 |
| | KL-245 (g) | 0.012 | 0.012 | 0.012 | 0.012 |
| | B-20 (g) | 0.1 | 0.1 | 0.1 | 0.1 |
| Binder resin | Aqueous dispersion of acrylic resin (X-1) (g) | 14.9 | 14.9 | 14.9 | 14.9 |
| Ion exchange water (g) | | 29.7 | 24.4 | 27.1 | 24.0 |
| Total (g) | | 100.012 | 100.012 | 100.012 | 100.012 |
| Static surface tension (mN/m) | | 29.47 | 29.50 | 29.45 | 29.49 |

In the tables, the abbreviations are as follows.
3 MB: 3-Methoxy-1-butanol
PG: Propylene glycol
GLY: Glycerol
TEG: Triethylene glycol
MMB: 3-Methyl-3-methoxy-1-butanol
MPD: 3-Methyl-1,5-pentanediol
SC-P1000: Polyoxypropylene(14) polyglyceryl ether
TEA: Triethanolamine
SF104PG50: SURFYNOL 104PG50 (Evonik Japan's surfactant. 50% by mass active ingredient)
SF420: SURFYNOL 420 (Evonik Japan's acetylene glycol surfactant)
KL-245: TEGO Wet KL245 (Evonik Japan's surfactant)
B-20: ACTICIDE B-20 (Thor Japan Ltd.'s preservative. 20% by mass active ingredient)
(Testing of the Water-Based Inks)

The characteristics of water-based inks (J1) to (J14) and (H1) to (H2) were tested as follows. The results are presented in Tables 10 to 14.

[Testing for Bleeding and Color Mixing on Printed Articles]

Each of the ink sets obtained in Examples and Comparative Examples, four colors of pigment inks per set, was loaded into Kyocera's KJ4B-YH inkjet heads. The supply pressure was adjusted by setting the difference in hydraulic head from the surface of the nozzle plate of the heads to the subtanks for inks to +35 cm and the negative pressure to −5.0 kPa.

The distance from the surface (x) on which the inkjet heads had ink orifices to the point (y) where an imaginary perpendicular to the surface (x) meets the recording medium (gap) was set to 1 mm or 2 mm. The recording medium was coated paper, OK Top Coat. The conditions for the driving of the heads were the standard voltage and standard temperature for inkjet heads. A printed article was obtained by printing 100% solid images in the four colors side by side with the droplet size set to 18 pL. In the production of the printed article, the inkjet head pitch was 6 cm, and the print speed was that achieved by 600-dpi heads printing at an image density of 600 pi.

The printed article was observed under a microscope (magnification of 40 times), and the degree of cross-bleeding and mixing between colors on the printed article was assessed.

⊙: Color mixing was observed only at the color borders between solid images in two colors. No bleeding or color mixing had occurred in the rest of the printed area.

○: Although mixing was observed even in areas other than the points of contact between solid images in two colors, the original colors remained.

x: Secondary colors had resulted from mixing between solid images in two colors, with no printed area in an original color.

The static surface tension of the inks was measured under the following conditions using an automatic surface tensiometer based on the Wilhelmy method.

Measuring instrument: An automatic surface tensiometer (K100MK3, KRUSS)
Measuring temperature: 25° C.
Measuring probe: A platinum plate for bleeding and color mixing in the way described above, "Black/magenta" means the border between the 100% solid image printed with the black pigment ink and that with the magenta pigment ink was examined for bleeding and color mixing in the way described above, "Black/yellow" means the border between the 100% solid image printed with the black pigment ink and that with the yellow pigment ink was examined for bleeding and color mixing in the way described above, and "Magenta/yellow" means the border between the 100% solid image printed with the magenta pigment ink and that with the yellow pigment ink was examined for bleeding and color mixing in the way described above.

REFERENCE SIGNS LIST

1: T-shaped micromixer M1
2: T-shaped micromixer M2
3: T-shaped micromixer M3
4: Tube reactor R1
5: Tube reactor R2
6: Tube reactor R3
7: Precooling tube reactor P1
8: Precooling tube reactor P2
9: Precooling tube reactor P3
10: Precooling tube reactor P4

The invention claimed is:

1. An ink set comprising a black pigment ink (a) having a static surface tension (a1) of 20 mN/m to 40 mN/m and at least one pigment ink (b) selected from the group consisting of a magenta pigment ink and a yellow pigment ink, wherein a static surface tension of the pigment ink (b) is smaller than static surface tension (a1) by 0.1 mN/m to 0.7 mN/m,
wherein when a recording surface of the recording medium is brought into contact with water for 100 msec, the recording medium absorbs 10 g/m² or less water.

2. The ink set according to claim 1, further comprising a cyan pigment ink with any static surface tension.

3. A method for producing a printed article, the method comprising ejecting the ink set according to claim 2 onto a recording medium by inkjet recording, the ink set including

TABLE 9

|  | Example 1 | Example 2 | Example 3 | Comparative Example 1 | Comparative Example 2 | Comparative Example 3 |
|---|---|---|---|---|---|---|
| Gap | 1 mm | 1 mm | 2 mm | 1 mm | 1 mm | 2 mm |
| Cyan/black | ○ | ○ | ○ | ○ | ○ | ○ |
| Cyan/magenta | ⊙ | ⊙ | ⊙ | ⊙ | ⊙ | ⊙ |
| Cyan/yellow | ○ | ○ | ○ | ⊙ | ⊙ | ⊙ |
| Black/magenta | ⊙ | ⊙ | ⊙ | X | X | X |
| Black/yellow | ⊙ | ⊙ | ⊙ | X | X | X |
| Magenta/yellow | ⊙ | ○ | ○ | ○ | ○ | ○ |

In the table, "Cyan/black" means the border between the 100% solid image printed with the cyan pigment ink and that with the black pigment ink was examined for bleeding and color mixing in the way described above, "Cyan/magenta" means the border between the 100% solid image printed with the cyan pigment ink and that with the magenta pigment ink was examined for bleeding and color mixing in the way described above, "Cyan/yellow" means the border between the 100% solid image printed with the cyan pigment ink and that with the yellow pigment ink was examined the black pigment ink (a), the magenta pigment ink and the yellow pigment ink as the pigment ink (b), and the cyan pigment ink, wherein:
the black pigment ink (a), the cyan pigment ink, and then the magenta and yellow pigment inks are ejected onto the recording medium using an inkjet recording device;
a static surface tension of the magenta pigment ink is smaller than static surface tension (a1) by 0.1 mN/m to 0.7 mN/m;

a static surface tension of the yellow pigment ink is smaller than the static surface tension of the magenta pigment ink by 0.1 mN/m to 0.7 mN/m; and the cyan pigment ink can have any static surface tension.

4. The ink set according to claim 1, wherein the pigment ink (b) is ejected onto a recording medium by inkjet recording after the black pigment ink (a) is ejected by inkjet recording and lands on the recording medium.

5. The ink set according to claim 1, wherein the ink set includes the black pigment ink (a), magenta and yellow pigment inks as the pigment ink (b), and the cyan pigment ink;

the black pigment ink (a), the cyan pigment ink, and then the magenta and yellow pigment inks are ejected onto a recording medium by inkjet recording;

a static surface tension of the magenta pigment ink is smaller than static surface tension (a1) by 0.1 mN/m to 0.7 mN/m, a static surface tension of the yellow pigment ink is smaller than the static surface tension of the magenta pigment ink by 0.1 mN/m to 0.7 mN/m; and the cyan pigment ink can have any static surface tension.

6. The ink set according to claim 1, wherein the ink set is used in an inkjet recording process in which a distance from a surface (x) on which an inkjet head has ink orifices thereof to a point (y) where a perpendicular to the surface (x) meets a recording medium is 2 mm or more.

7. The ink set according to claim 1, wherein the recording medium is corrugated fiberboard or corrugated fiberboard having a layer with a water absorption of 10 g/m$^2$ or less.

8. A method for producing a printed article, the method comprising a printing step in which the ink set according to claim 1 is ejected onto a recording medium by inkjet recording to give a printed article, wherein in the printing step, a shortest distance between ink orifices of an inkjet head and the recording medium is 2 mm or more.

* * * * *